(12) United States Patent  (10) Patent No.: US 6,724,167 B1
Tanaka  (45) Date of Patent: Apr. 20, 2004

(54) NUMERICAL CONTROL DRIVE SYSTEM

(75) Inventor: Toshiki Tanaka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/980,713
(22) PCT Filed: Mar. 17, 2000
(86) PCT No.: PCT/JP00/01672
§ 371 (c)(1),
(2), (4) Date: Dec. 5, 2001
(87) PCT Pub. No.: WO01/71903
PCT Pub. Date: Sep. 27, 2001

(51) Int. Cl.⁷ ............................................... G05B 19/18
(52) U.S. Cl. ........................ 318/569; 318/560; 318/567
(58) Field of Search ................................. 318/569, 560, 318/567, 594, 600, 625, 34, 254, 562, 568

(56) References Cited

U.S. PATENT DOCUMENTS 4,386,305 A * 5/1983 Kohzai et al. .............. 318/571
4,641,069 A * 2/1987 Fujioka et al. .............. 318/625
6,008,609 A * 12/1999 Sawashima et al. ........ 318/570
6,025,683 A * 2/2000 Philipp ....................... 318/257
6,081,090 A * 6/2000 Takaki et al. ............... 318/567
6,091,219 A * 7/2000 Maruo et al. ............... 318/562

* cited by examiner

Primary Examiner—Jonathan Salata
Assistant Examiner—Renata McCloud
(74) Attorney, Agent, or Firm—Sughrue Mion, PLLC

(57) ABSTRACT

In a numerical control system of the invention, a motor drive power converter 1a comprises input current determination means 12 for comparing an input current found by input current detection means 11 with an allowable current value with respect to less-than, equal-to, or greater-than relation, and acceleration/deceleration command change signal output means 13 for outputting a control signal to a drive unit 2a, 3a based on the determination result of the input current determination means 12. If the input current determination means 12 determines that input current Ii> allowable current value I0, acceleration/deceleration command generation means 15a, 15b of the drive unit 2a, 3a changes an acceleration/deceleration command (lessens the inclination of a speed command), thereby lowering the input current Ii.

8 Claims, 17 Drawing Sheets

INPUT PHASE-TO-PHASE VOLTAGE VAC

INPUT CURRENT Ii

INPUT CURRENT DETECTION PERIOD (CONTROL PERIOD)

INPUT CURRENT Ii

SPEED ω

DRIVE CURRENT Id

INPUT CURRENT Ii

SPEED ω

DRIVE CURRENT Id

INPUT PHASE-TO-PHASE VOLTAGE VAC

INPUT CURRENT Ii

INPUT CURRENT IS DETECTED ONLY IN THE VICINITY OF PHASE WHERE THE INPUT CURRENT REACHES THE PEAK

NUMERICAL CONTROL DRIVE SYSTEM

TECHNICAL FIELD

This invention relates to a numerical control drive system and in particular to a numerical control drive system having a servo drive unit for driving a motor, a drive unit such as a spindle drive unit, a numerical control unit for outputting a control command for driving the motor to the two or more drive units, and a motor drive power converter for converting AC power into DC power and supplying the DC power to the two or more drive units.

BACKGROUND OF THE INVENTION

FIG. 16 is a drawing to show the configuration of a numerical control (NC) drive system in a related art. In the Figure, numeral 41 denotes an AC power supply, numeral 42 denotes an AC reactor, numeral 43 denotes a motor drive power converter, numeral 44 denotes a spindle drive unit, numeral 45 denotes a spindle motor driven by the spindle drive unit 44, numeral 46 denotes a servo drive unit, numeral 47 denotes a servo motor driven by the servo drive unit 46, numeral 48 denotes an NC unit, and numeral 49 denotes a bus line. Numeral 50 denotes an AC-DC conversion circuit, numeral 51 denotes a diode, numeral 52 denotes a power module, and numeral 53 denotes a smoothing capacitor.

The motor drive power converter 43 rectifies AC power (L1, L2, L3) input via the AC reactor 42 from the AC power supply 41 to direct current through the diode 51, further smoothes the direct current through the smoothing capacitor 53 to produce DC power supply voltage VP, VN, to the spindle drive unit 44 and the servo drive unit 46. The spindle drive unit 44 and the servo drive unit 46 input the DC power supply voltage VP, VN and drive the spindle motor 45 and the servomotor 47 based on a position command from the NC unit 48.

When the servomotor 47 or the spindle motor 45 performs power running at the acceleration time, the AC-DC conversion circuit 50 rectifies alternating current to direct current and through the diode 51 supplies power. When the servomotor 47 or the spindle motor 45 runs in a regenerative mode at the deceleration time, the power module 52 switches so as to return the power to the AC power supply 41.

In recent years, with productivity improvement of a tool machine and development of technologies, shortening of the acceleration/deceleration time constant in a rapid feed mode and shortening of the cycle time have been demanded and further a larger torque (electric current) has been demanded at the acceleration/deceleration time and a servo drive unit and a spindle drive unit have been put into a high gain.

The demands for providing a high torque and a high gain described above have resulted in severe operating conditions of thermal stress of excessive current and power cycle in the motor drive power converter for supplying power to the servo drive unit and the spindle drive unit, and the capacity of the motor drive power converter has been increased as measures against heat of a diode and a power module and thus there are problems of upsizing and an increase in costs.

FIG. 17 is a block diagram of a variable-speed controller of an AC motor in a related art described in Japanese Patent Laid-Open No.85085/1986. In the Figure, numeral 61 denotes a motor for driving load of a fan, a pump, etc., numeral 62 denotes a position sensor being attached to the motor 61 for detecting the number of revolutions of the motor 61, and numeral 63 denotes an AC variable-speed drive for operating the motor 61 at variable speeds, an AC power supply being connected to the primary side of the AC variable-speed drive via a current transformer 64. Numeral 65 denotes is an overcurrent relay being connected to the secondary side of the current transformer 64 for stopping the operation of the AC variable-speed drive 63 to protect the motor if the motor is operated or accelerated in such a manner that the primary current value of the operation of the AC variable-speed drive 63 exceeds a rated value, and numeral 66 denotes a speed reference controller for setting speed reference. Numeral 67 denotes a current comparison controller for comparing the input current with a preset current limit value based on the input current supplied via the current transformer 64 to the AC variable-speed drive 63 and the number of revolutions of the motor input from the position sensor 62, and sends a control signal to the speed reference controller 66.

In a self-cooled motor with the cooling effect changing in response to the number of revolutions, the cooling effect changes in response to the number of revolutions and the current value limited from the heat resistance amount of the motor changes. A variable-speed controller of an AC motor in a related art is adapted to operate the motor within predetermined current limit values without stopping the motor by presetting the current limit value at the rated operation time and the current limit value at the acceleration time in all variable-speed area from the relationship between the cooling effect responsive to the number of revolutions and the heat resistance amount and when the input current reaches the current limitvalue at the related operation time in the rated operation mode, decreasing the number of revolutions of the motor for lowering the input current or when the input current reaches the current limit value at the related operation time in the acceleration operation mode, limiting an increase in the input current for temporarily stopping the acceleration.

In the variable-speed controller of an AC motor in the related art described above, if the input current of the AC variable-speed drive exceeds the rated value, the operation thereof is stopped by means of the overcurrent relay for protecting the motor or when the input current of the AC variable-speed drive is compared with the preset current limit value and the input current reaches the current limit value, the input current is lowered or an increase in the input current is limited, whereby protection against overheating is conducted without stopping the motor, namely, protection of the variable-speed controller is accomplished singly. In the whole NC drive system made up of the spindle drive unit 44 for driving the spindle motor 45, the servo drive unit 46 for driving the servomotor 47, etc., as shown in FIG. 16, if the spindle drive unit 44 or the servo drive unit 46 is equal to or less than the allowable current, whether or not an overcurrent occurs as the whole NC drive system cannot be determined; this is a problem.

The invention is intended for solving the problems as described above and it is an object of the invention to provide an NC drive system capable of performing stable motor control without increasing the capacity of a background motor drive power converter even in high-speed, high-acceleration drive.

DISCLOSURE OF THE INVENTION

According to the invention, there is provided a numerical control drive system having two or more drive units consisting of a servo drive unit for driving a motor, a spindle drive unit, etc., a numerical control unit for outputting a control command for driving the motor to the two or more drive units, and a motor drive power converter for converting AC power into DC power and supplying the DC power to the two or more drive units, wherein the motor drive power converter comprises input current detection means for finding an input current, input current determination means for comparing the input current found by the input current detection means with an allowable current value with respect to less-than, equal-to, or greater-than relation, and control signal output means for outputting a control signal to the drive unit based on the determination result of the input current determination means, wherein the drive unit comprises control signal execution means for changing the control command from the numerical control unit based on the control signal output from the control signal output means, and wherein if the input current determination means determines that the input current is greater than the allowable current value, the control signal execution means of the drive unit changes the control command from the numerical control unit, thereby lowering the input current.

If the input current determination means determines that the input current is greater than the allowable current value, the control signal execution means performs processing of lessening the inclination of a speed command.

If the input current determination means determines that the input current is greater than the allowable current value, the control signal execution means shuts off the gates of the switching elements of the drive units.

If the input current determination means determines that the input current is greater than the allowable current value, the control signal execution means clamps a speed command.

If the input current determination means determines that the input current is greater than the allowable current value, the control signal execution means clamps a motor drive current.

The motor drive power converter comprises phase detection means for detecting a power supply phase of the AC power and the input current determination means inputs the power supply phase detected by the phase detection means and compares the input current with the allowable current value with respect to the less-than, equal-to, or greater-than relation in the proximity of the power supply phase where the input current changes in direction.

The control signal output means inputs at least either motor drive currents or motor speeds from the two or more drive units to which the DC power is supplied, and selects the drive unit to which the control signal is to be output.

The motor drive power converter comprises cumulative-sum-of-times retention means for retaining the cumulative sum of times the input current determination means has determined that the input current exceeds the allowable current value, and alarm determination means for outputting an alarm to the drive units and the numerical control unit if the cumulative sum of times retained in the cumulative-sum-of-times retention means becomes equal to or greater than a reference value.

The motor drive power converter comprises input current output means for outputting the input current found by the input current detection means to the numerical control unit.

BEST MODE FOR CARRYING OUT THE INVENTION

Embodiment 1

Figure 1:
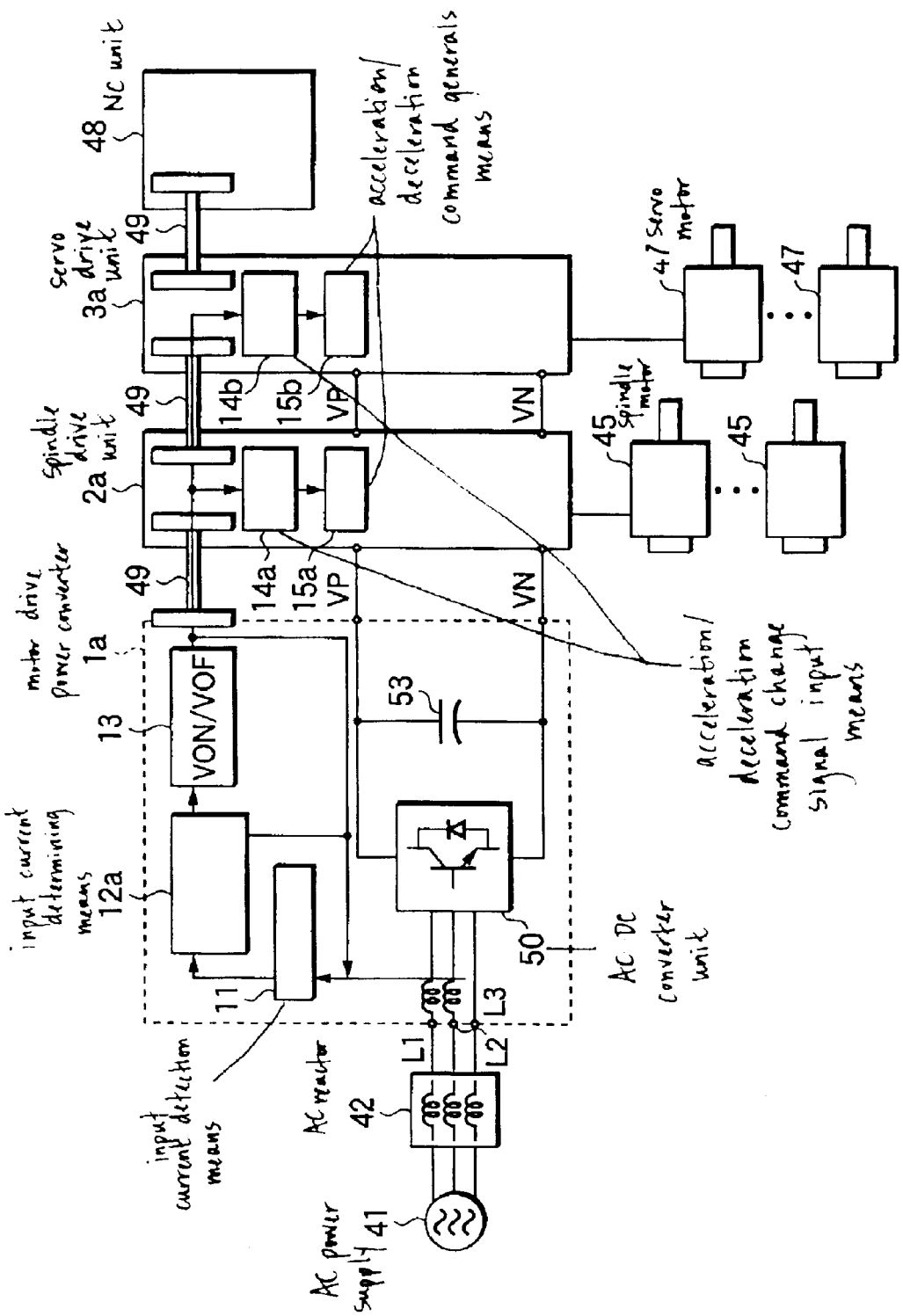
FIG. 1 is a drawing to show the configuration of an NC drive system according to embodiment 1 of the invention.
Figure 16:
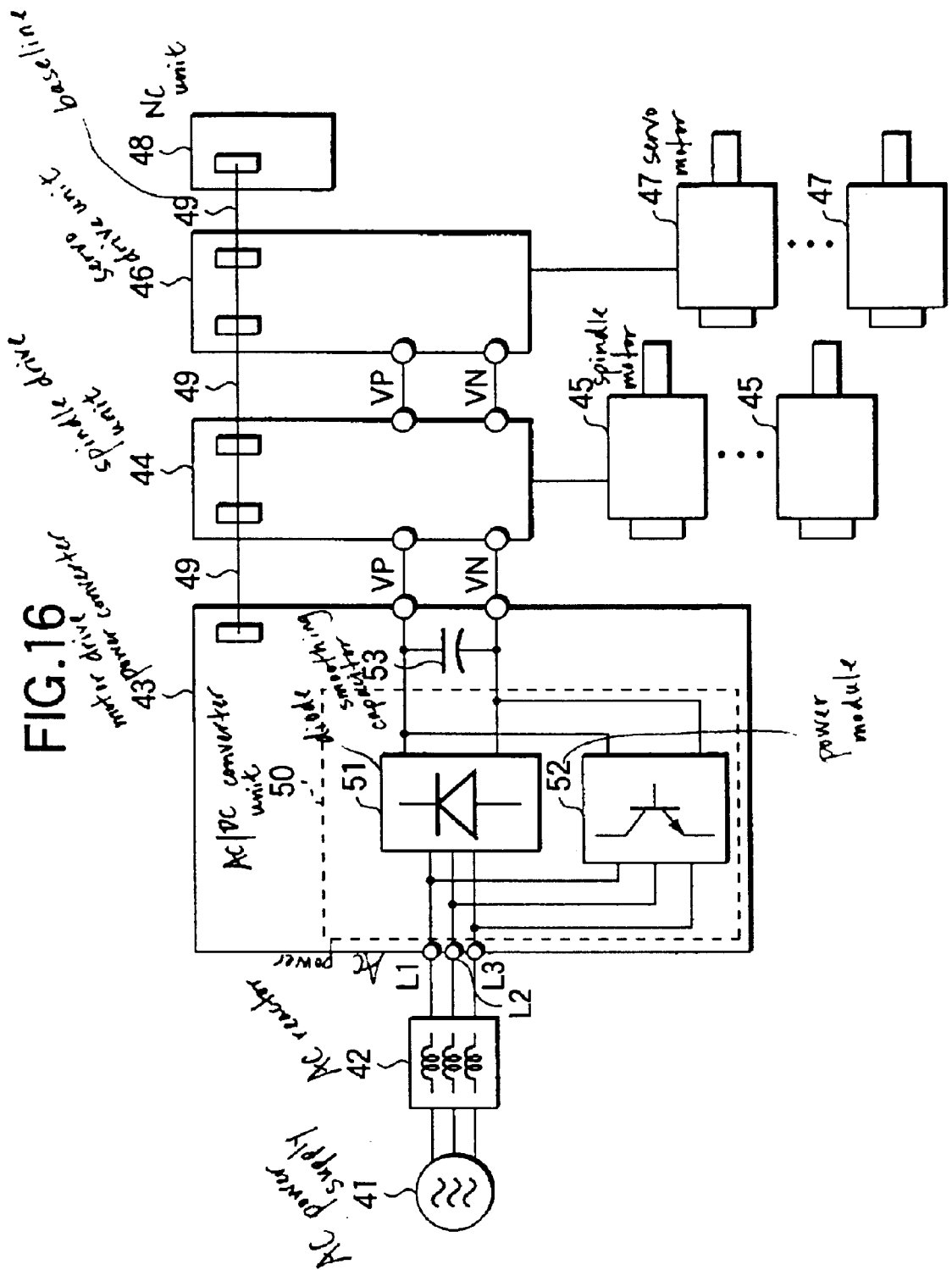
FIG. 16 is a drawing to show the configuration of an NC drive system in a related art.
Figure 17:
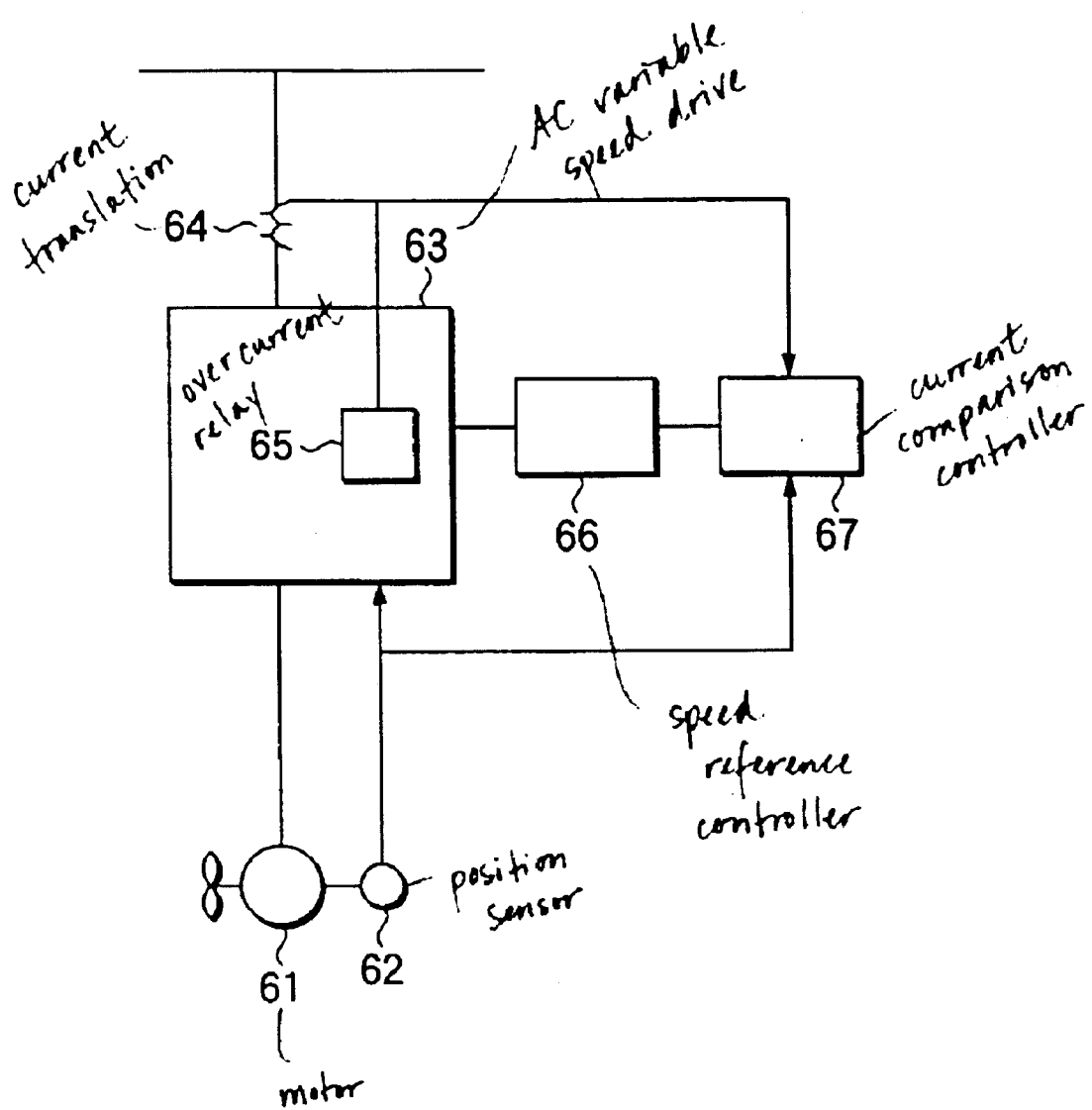
FIG. 17 is a block diagram of a variable-speed controller of an AC motor in a related art described in Japanese Patent Laid-Open No.85085/1986.

FIG. 1 is a drawing to show the configuration of an NC drive system according to embodiment 1 of the invention. In the figure, numerals 41, 42, 45, 47 to 49, 50, and 53 are similar to those in FIG. 16 in the related art example and will not be discussed again. Numeral 1a denotes a motor drive power converter, numeral 2a denotes a spindle drive unit, and numeral 3a denotes a servo drive unit.

Numeral 11 denotes input current detection means for detecting input currents IL1 and IL2 of phases L1 and L2 and finding input current Ii, numeral 12a denotes input current determination means for comparing the input current Ii with allowable current value I0 with respect to less-than, equal-to, or greater-than relation, and numeral 13 denotes acceleration/deceleration command change signal output means as control signal output means for outputting an acceleration/deceleration command change request signal VON or an acceleration/deceleration command change invalidation signal VOF to the spindle drive unit 2a and the servo drive unit 3a based on the determination result of the input current determination means 12a. Numerals 14a and 14b denote acceleration/deceleration command change signal input means for inputting the acceleration/deceleration command change request signal VON or the acceleration/deceleration command change invalidation signal VOF, and numerals 15a and 15b denote acceleration/deceleration command generation means for changing an acceleration/deceleration command based on the acceleration/deceleration command change request signal VON from the acceleration/deceleration command change signal input means 14a and 14b; in embodiment 1, control signal execution means is made up of the acceleration/deceleration command change signal input means 14a and 14b and the acceleration/deceleration command generation means 15a and 15b.

The operation, wherein the motor drive power converter 1a converts AC power (L1, L2, L3) input via an AC reactor 42 from an AC power supply 41 into DC power supply voltage VP, VN, and supplies the DC power supply voltage VP, VN to the spindle drive unit 2a and the servo drive unit 3a, and the spindle drive unit 2a and the servo drive unit 3a input the DC power supply voltage VP, VN and drive a spindle motor 45 and a servomotor 47 based on a move command given on a bus line 49 from an NC unit 48, is similar to that in the related art example.

Figure 2A:
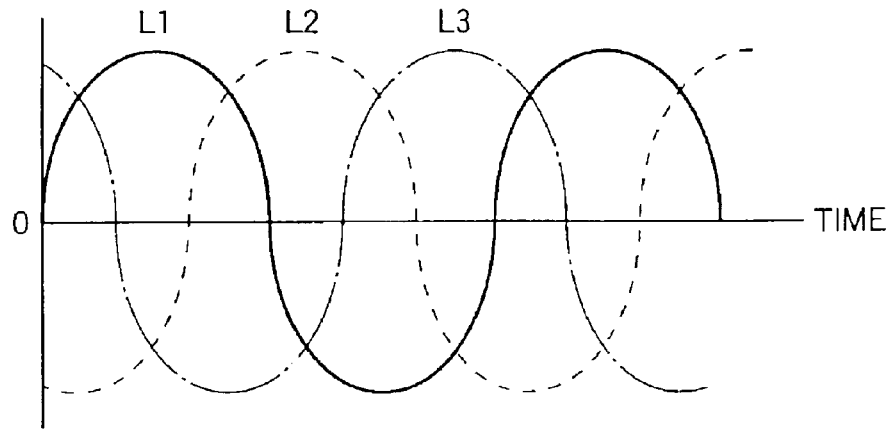
FIGS. 2(a), 2(b) and 2(c) are drawings to show the relationship between input current and control period in the NC drive system according to embodiment 1 of the invention.
Figure 2B:
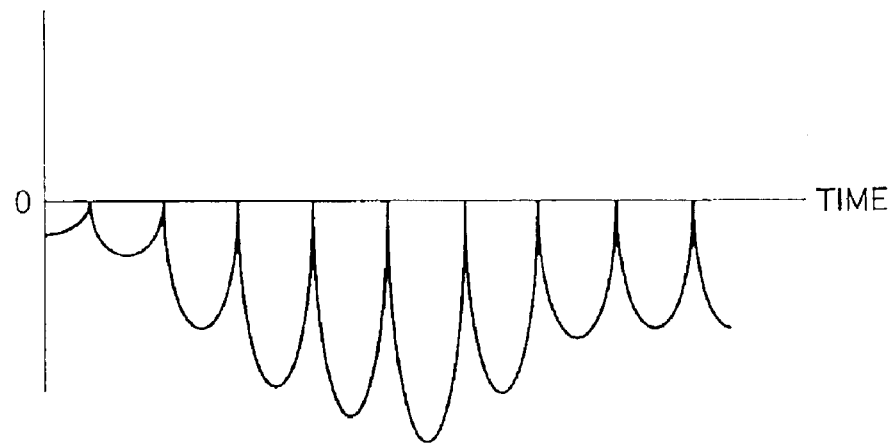
Figure 2C:

FIG. 2 is a drawing to show the relationship between input current and control period in the NC drive system according to embodiment 1 of the invention; (a) shows the waveform of an input phase-to-phase voltage VAC, (b) shows the waveform of the input current Ii, and (c) shows an input current detection period. In the FIG., the input phase-to-phase voltage VAC has the power supply voltage waveform of phases (L1, L2, L3) in the phase order of L1 to L2 to L3, and the less-than, equal-to, or greater-than relation between the phase-to-phase voltages of the phases changes every T/6 where T is power supply period. The input current Ii has a flowing phase changing on T/6 period based on the less-than, equal-to, or greater-than relation between the phase-to-phase voltages, and becomes zero every T/6. The input current detection period which becomes the control period is a sufficiently shorter value than the period of the input current.

Figure 3A:
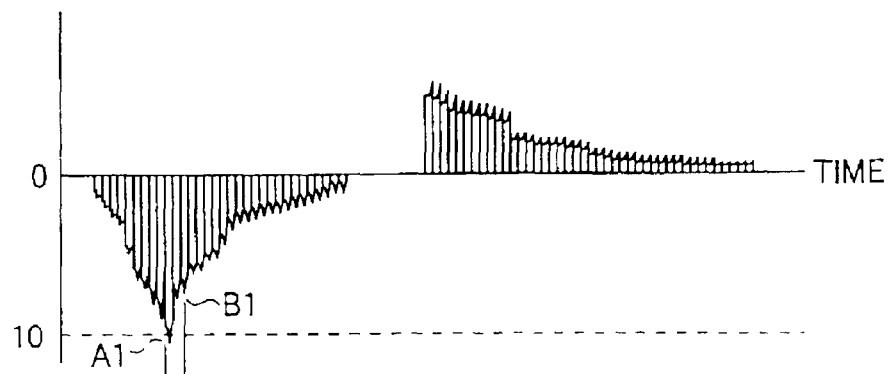
FIGS. 3(a), 3(b) and 3(c) are drawings to show the characteristics in the NC drive system according to embodiment 1 of the invention.
Figure 3B:
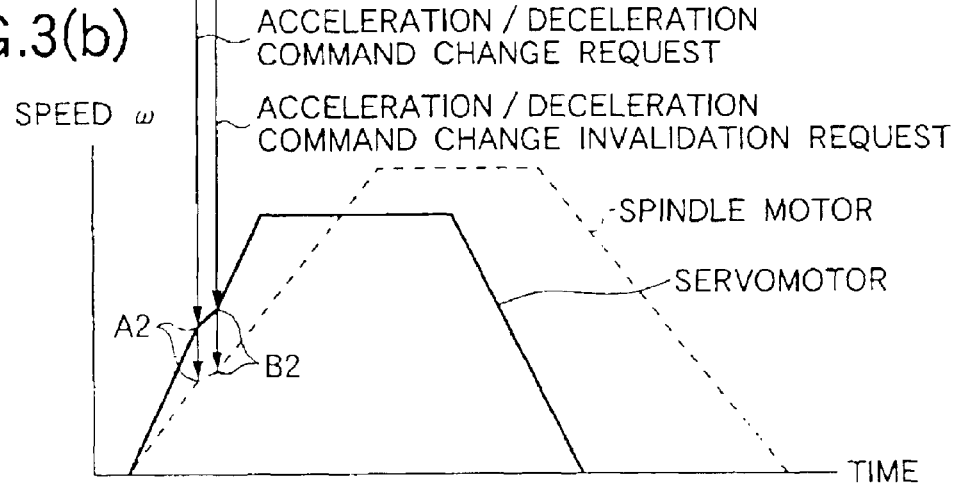
Figure 3C:
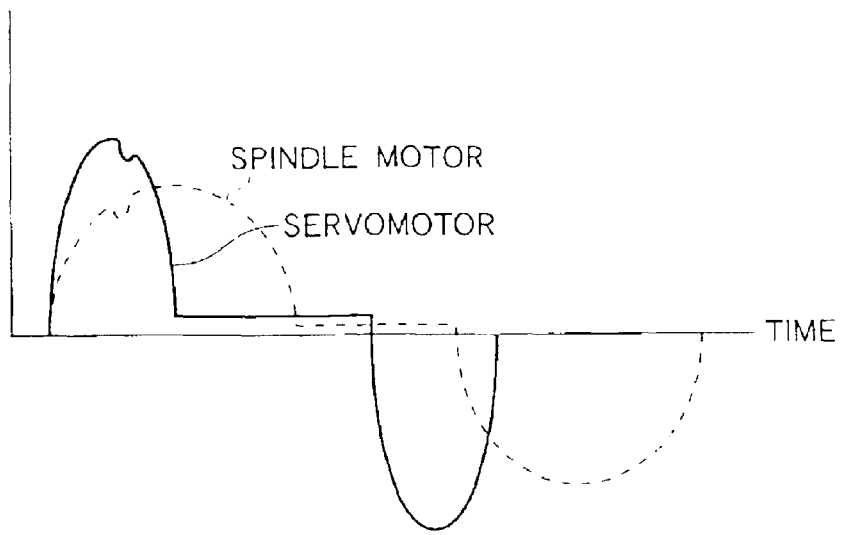

FIG. 3 is a drawing to show the characteristics in the NC drive system according to embodiment 1 of the invention; (a) shows the characteristic of the input current Ii detected by the input current detection means 11, (b) shows the speed characteristic of the motor (spindle motor 45 or servomotor 47), and (c) shows the characteristic of motor drive current. In the Figure, A1 is the point in time when the input current determination means 12a determines that input current Ii>allowable current value I0, A2 is the point in time when the acceleration/deceleration command generation means 15a, 15b changes the acceleration/deceleration command (lessens the inclination of the speed command) based on the acceleration/deceleration command change request signal VON, B1 is the point in time when the input current Ii lessens as the inclination of the speed command is lessened and the input current determination means 12a determines that input current Ii≦allowable current value I0, and B2 is the point in time when the acceleration/deceleration command generation means 15a, 15b restores the acceleration/deceleration command to an acceleration/deceleration command based on a position command from the NC unit 48 based on the acceleration/deceleration command change invalidation signal VOF.

The operation of acceleration/deceleration command change in embodiment 1 will be discussed with reference to FIGS. 1 to 3.

The input current determination means 12a compares the input current Ii found by the input current detection means 11 with the allowable current value I0 with respect to less-than, equal-to, or greater-than relation and if the input current Ii becomes greater than the allowable current value I0 (A1 in FIG. 3(a)), the input current determination means 12a outputs a signal to the effect that Ii>I0 to the acceleration/deceleration command change signal output means 13. If Ii becomes greater than I0, the acceleration/deceleration command change signal output means 13 outputs the acceleration/deceleration command change request signal VON to the spindle drive unit 2a and the servo drive unit 3a.

When the acceleration/deceleration command change signal input means 14a and 14b of the spindle drive unit 2a and the servo drive unit 3a input the acceleration/deceleration command change request signal VON, the means output the acceleration/deceleration command change request signal VON to the acceleration/deceleration command generation means 15a and 15b. When the acceleration/deceleration command generation means 15a and 15b input the acceleration/deceleration command change request signal VON, the means change the acceleration/deceleration command (lessen the inclination of the speed command) (A2 to B2 in FIG. 3(b)) Since the spindle drive unit and the servo drive unit lessen the inclination of the speed command, drive current Id lessens and the input current Ii also lessens in proportion to the drive current Id as shown in expression (1):

$$Ii \propto (\omega \times Id) \quad \text{expression (1)}$$

If the input current Ii becomes equal to or less than the allowable current value I0 (B1 in FIG. 3(a)), the input current determination means 12a outputs a signal to the effect that Ii≦I0 to the acceleration/deceleration command change signal output means 13. If Ii becomes equal to or less than I0, the acceleration/deceleration command change signal output means 13 outputs the acceleration/deceleration command change invalidation signal VOF to the spindle drive unit 2a and the servo drive unit 3a.

When the acceleration/deceleration command change signal input means 14a and 14b of the spindle drive unit 2a and the servo drive unit 3a input the acceleration/deceleration command change invalidation signal VOF, the means output the acceleration/deceleration command change invalidation signal VOF to the acceleration/deceleration command generation means 15a and 15b. When the acceleration/deceleration command generation means 15a and 15b input the acceleration/deceleration command change invalidation signal VOF, the means validate the position command from the NC unit 48 and restore the acceleration/deceleration command to the acceleration/deceleration command based on the position command from the NC unit 48 (B2 in FIG. 3(b)).

In the NC drive system of embodiment 1, if it is determined that the input current Ii of the motor drive power converter is greater than the allowable current value I0, the input current Ii is lowered, whereby stable motor control can be executed without increasing the capacity of the motor drive power converter for high-speed, high-acceleration drive of the NC drive system. The speed change amount is controlled and the inclination of the speed command is lessened, whereby the input current Ii is lowered. Thus, the input current Ii can be lowered with the speed control maintained, and the system is suited for application where high-acceleration operation is performed while path accuracy is maintained.

Embodiment 2

Figure 4:
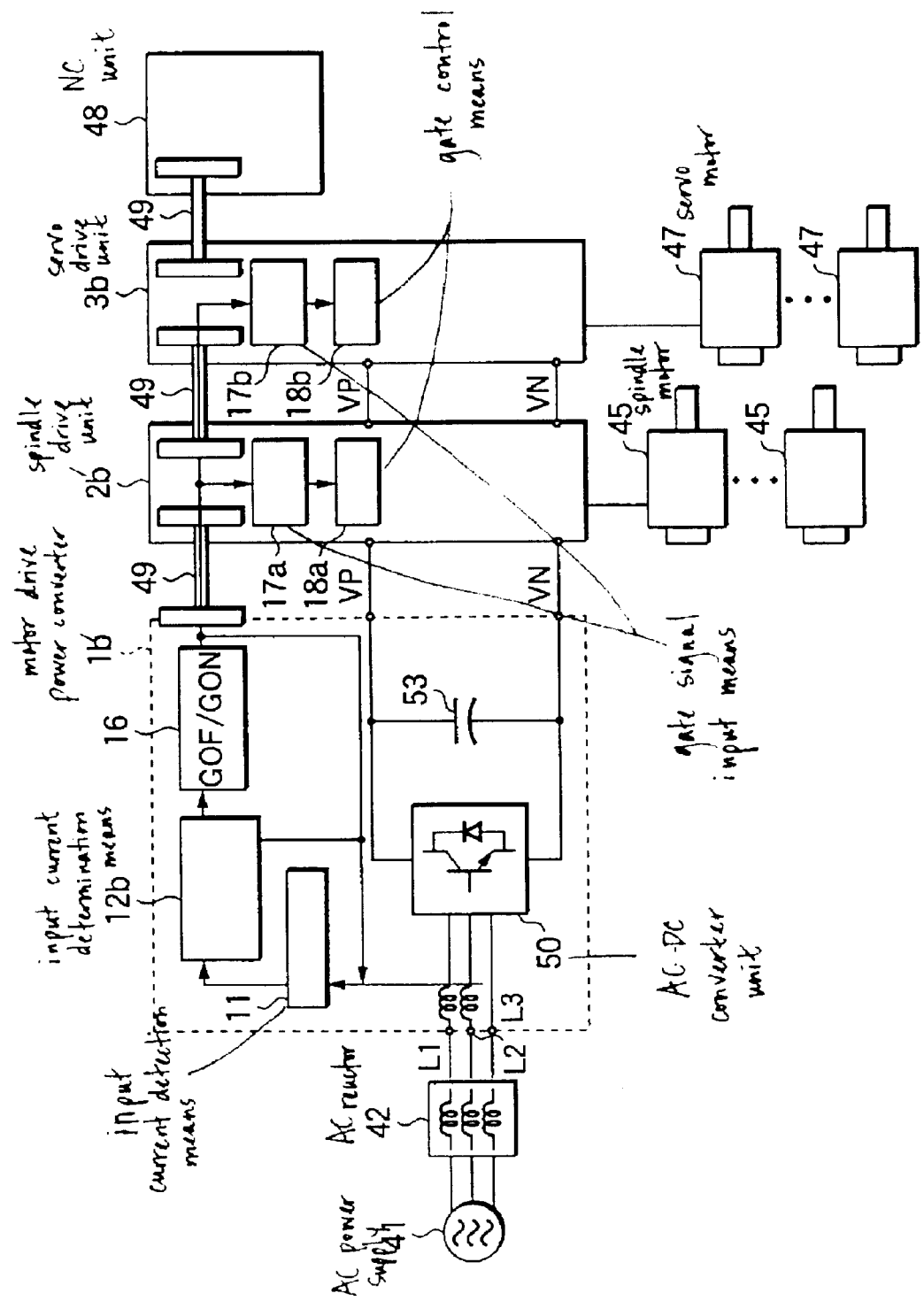
FIG. 4 is a drawing to show the configuration of an NC drive system according to embodiment 2 of the invention.

FIG. 4 is a drawing to show the configuration of an NC drive system according to embodiment 2 of the invention. In the Figure, numerals 11, 41, 42, 45, 47 to 49, 50, and 53 are similar to those in FIG. 1 and will not be discussed again. Numeral 1b denotes a motor drive power converter, numeral 2b denotes a spindle drive unit, and numeral 3b denotes a servo drive unit. Numeral 12b denotes input current determination means for comparing input current Ii with allowable current value I0 with respect to less-than, equal-to, or greater-than relation, and numeral 16 denotes gate signal output means as control signal output means for outputting a gate shut-off request signal GOF or a gate on signal GON to the spindle drive unit 2b and the servo drive unit 3b based on the determination result of the input current determination means 12b.

Numerals 7a and 7b denote gate signal input means for inputting the gate shut-off request signal GOF or the gate on signal GON, and numerals 18a and 18b denote gate control means for shutting off or turning on a gate based on the command from the gate signal input means 7a and 17b; in embodiment 2, control signal execution means is made up of the gate signal input means 17a and 7b and the gate control means 18a and 18b.

Figure 5A:
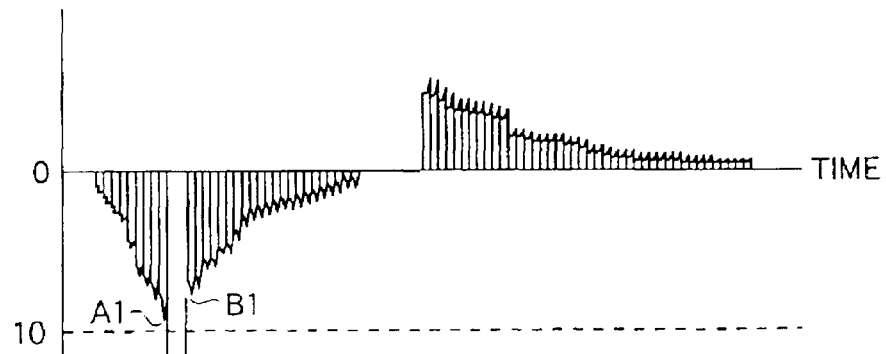
FIGS. 5(a), 5(b) and 5(c) are drawings to show the characteristics in the NC drive system according to embodiment 2 of the invention.
Figure 5B:
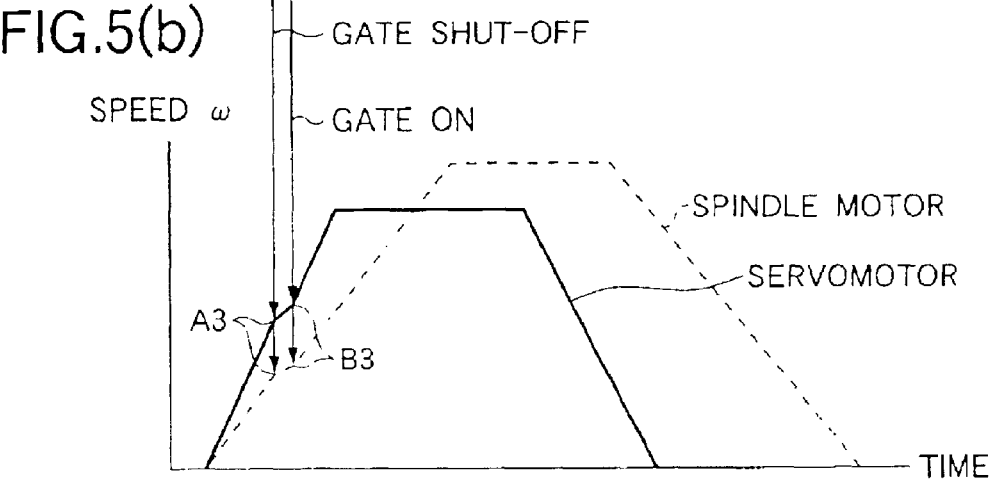
Figure 5C:
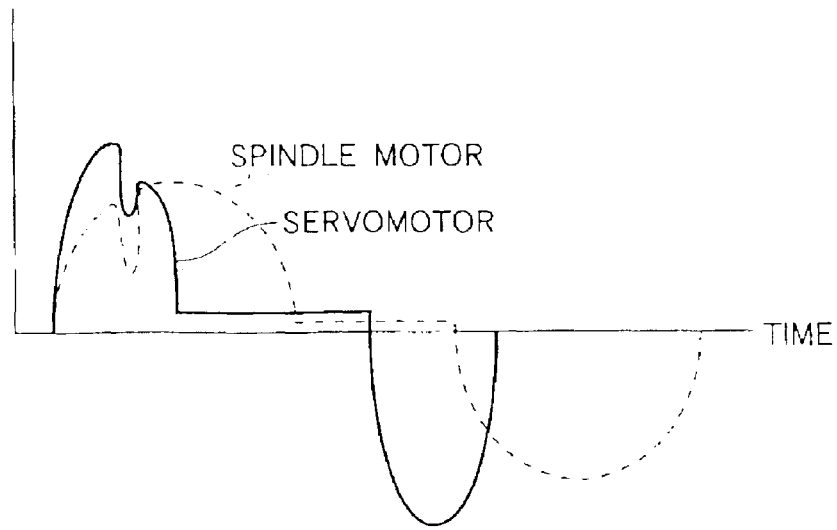

FIG. 5 is a drawing to show the characteristics in the NC drive system according to embodiment 2 of the invention; (a) shows the characteristic of the input current Ii detected by input current detection means 11, (b) show s the speed characteristic of a motor (spindle motor 45 or servomotor 47), and (c) shows the characteristic of motor drive current. In the Figure, A1 is the point in time when the input current determination means 12b determines that input current Ii>allowable current value I0, A3 is the point in time when the gate control means 18a, 18b shuts off the gate based on the gate shut-off request signal GOF, B1 is the point in time when the input current Ii lessens as the gate is shut off and the input current determination means 12b determines that input current Ii<allowable current value I0, and B3 is the point in time when the gate control means 18a, 18b turns on the gate based on the gate on signal GON.

The operation of gate control in embodiment 2 will be discussed with reference to FIGS. 4 and 5.

The input current determination means 12b compares the input current Ii found by the input current detection means 11 with the allowable current value I0 with respect to less-than, equal-to, or greater-than relation and if the input current Ii becomes greater than the allowable current value I0 (A1 in FIG. 5(a)) the input current determination means 12b outputs a signal t o the effect that Ii>I0 to the gate signal output means 16. If Ii becomes greater than I0, the gate signal output means 16 outputs the gate shut-off request signal GOF to the spindle drive unit 2b and the servo drive unit 3b.

When the gate signal input means 7a and 7b of the spindle drive unit 2b and the servo drive unit 3b input the gate shut-off request signal GOF, the means output the gate shut-off request signal GOF to the gate control means 18a and 18b. When the gate control means 18a and 18b input the gate shut-off request signal GOF, the means shut off the gates of switching elements (not shown) of the spindle drive unit 2b and the servo drive unit 3b.

As the gates are shut off, motor drive current Id lessens and the inclination of a speed command can be lessened (A3 to B3 in FIG. 5(b)) and thus the input current Ii also lessens as shown in expression (1) described above (Ii∝(ω×Id)).

If the input current Ii becomes equal to or less than the allowable current value I0 (B1 in FIG. 5(a)), the input current determination means 12b outputs a signal to the effect that Ii≦I0 to the gate signal output means 16. If Ii becomes equal to or less than I0, the gate signal output means 16 outputs the gate on signal GON to the spindle drive unit 2b and the servo drive unit 3b.

When the gate signal input means 7a and 7b of the spindle drive unit 2b and the servo drive unit 3b input the gate on signal GON, the means output the gate on signal GON to the gate control means 18a and 18b. When the gate control means 18a and 18b input the gate on signal GON, the means turn on the gates of the switching elements (not shown) of the spindle drive unit 2b and the servo drive unit 3b and restore the acceleration/deceleration command to the acceleration/deceleration command based on a position command from an NC unit 48 (B3 in FIG. 5(b)).

In the NC drive system of embodiment 2, if it is determined that the input current Ii of the motor drive power converter is greater than the allowable current value I0, the gates of the switching elements of the drive units are shut off, whereby the drive currents of the drive units can be set to zero and thus the input current Ii can be lowered at high speed and the system is suited for application of positioning not requiring path accuracy, such as a material-handling system.

Embodiment 3

Figure 6:
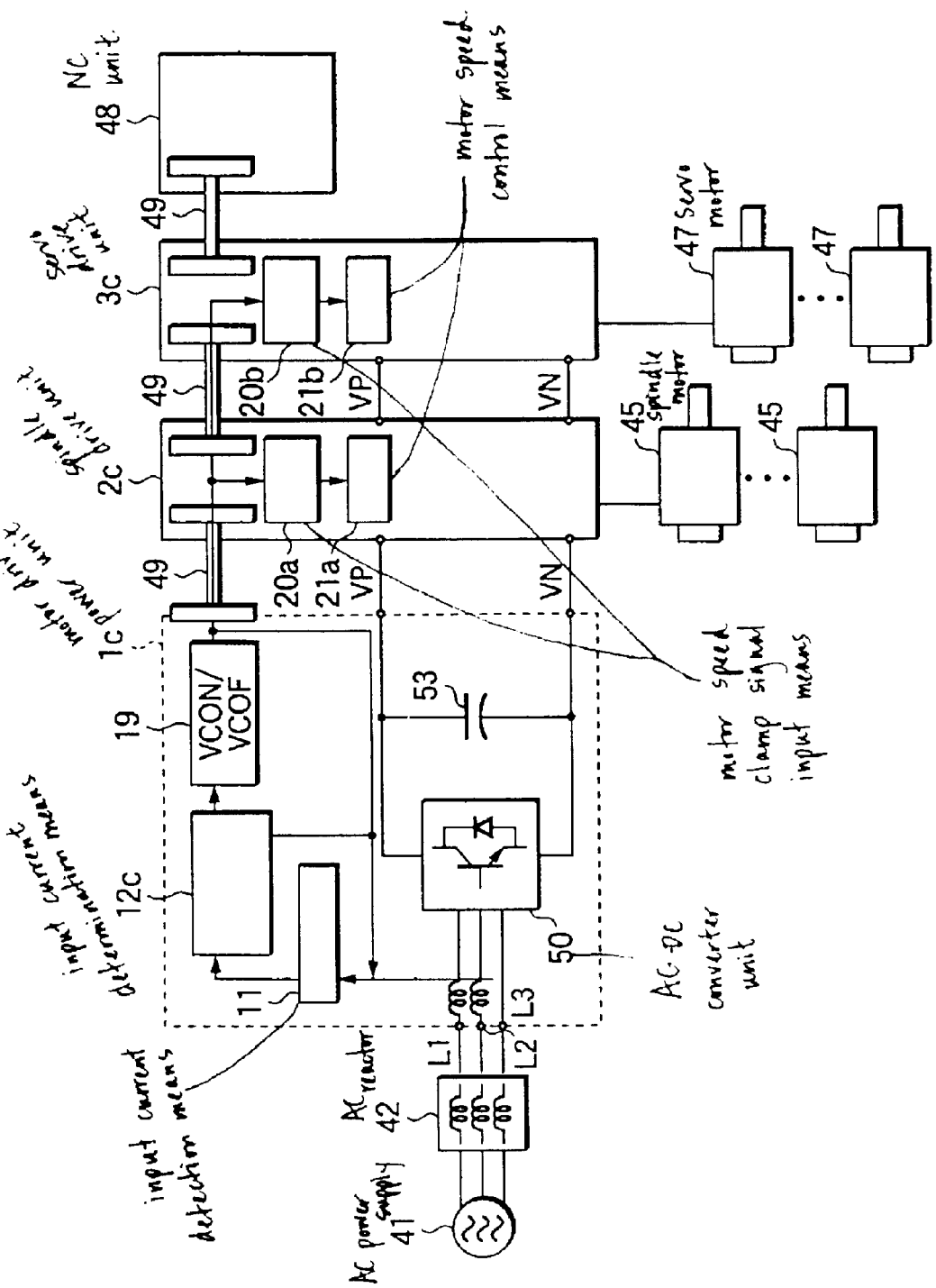
FIG. 6 is a drawing to show the configuration of an NC drive system according to embodiment 3 of the invention.

FIG. 6 is a drawing to show the configuration of an NC drive system according to embodiment 3 of the invention. In the FIG., numerals 11, 41, 42, 45, 47 to 49, 50, and 53 are similar to those in FIG. 1 and will not be discussed again. Numeral 1c denotes a motor drive power converter, numeral 2c denotes a spindle drive unit, and numeral 3c denotes a servo drive unit. Numeral 12c denotes input current determination means for comparing input current Ii with allowable current value I0 with respect to less-than, equal-to, or greater-than relation, and numeral 19 denotes motor speed clamp signal output means as control signal output means for outputting a motor speed clamp signal VCON or a motor speed clamp release signal VCOF to the spindle drive unit 2c and the servo drive unit 3c based on the determination result of the input current determination means 12c.

Numerals 20a and 20b denote motor speed clamp signal input means for inputting the motor speed clamp signal VCON or the motor speed clamp release signal VCOF, and numerals 21a and 21b denote motor speed control means for clamping the motor speed command based on the command from the motor speed clamp signal input means 20a and 20b; in embodiment 3, control signal execution means is made up of the motor speed clamp signal input means 20a and 20b and the motor speed control means 21a and 21b.

Figure 7A:
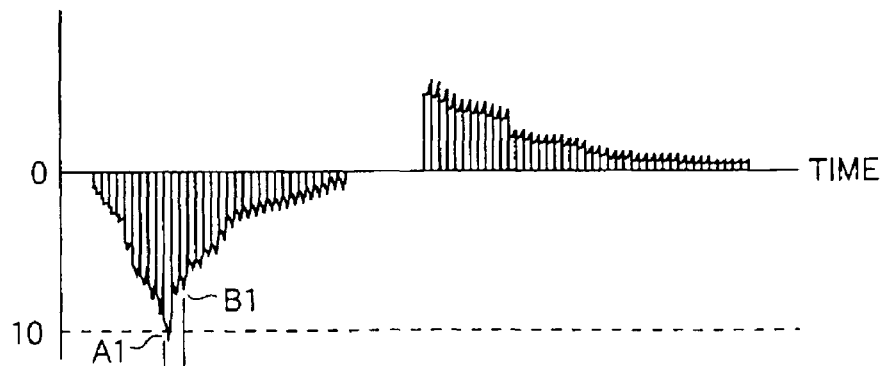
FIGS. 7(a), 7(b) and 7(c) are drawings to show the characteristics in the NC drive system according to embodiment 3 of the invention.
Figure 7B:
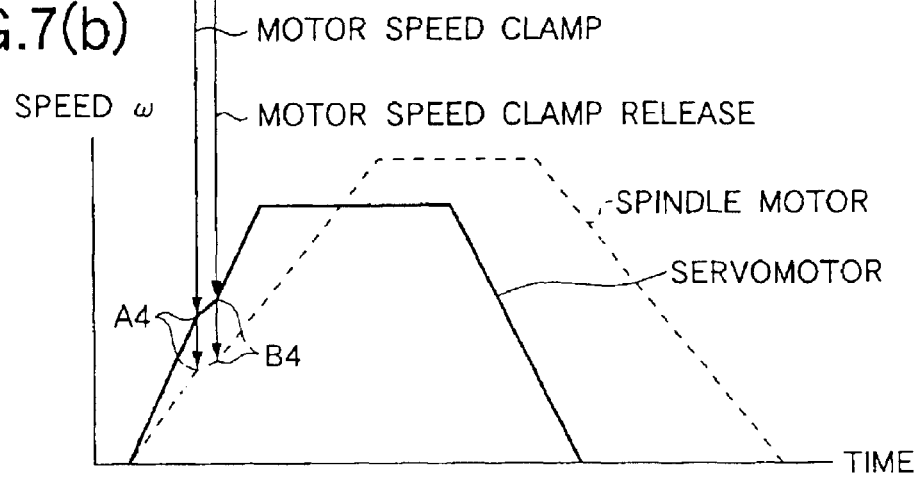
Figure 7C:
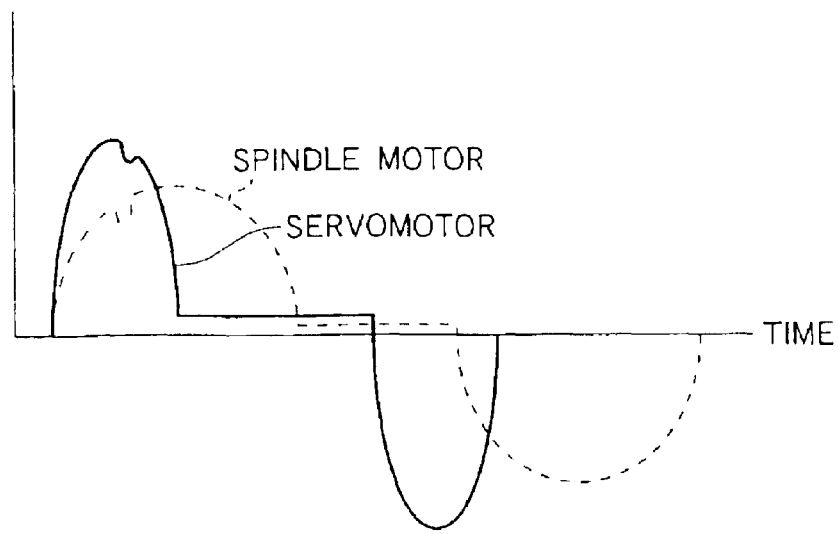

FIG. 7 is a drawing to show the characteristics in the NC drive system according to embodiment 3 of the invention; (a) shows the characteristic of the input current Ii detected by input current detection means 11, (b) shows the speed characteristic of a motor (spindle motor 45 or servomotor 47), and (c) shows the characteristic of motor drive current. In the FIG., A1 is the point in time when the input current determination means 12c determines that input current Ii>allowable current value I0, A4 is the point in time when the motor speed control means 12a, 21b clamps the motor speed command based on the motor speed clamp signal VCON, B1 is the point in time when the input current Ii lessens as the motor speed command is clamped and the input current determination means 12c determines that input current Ii≦ allowable current value I0, and B4 is the point in time when the motor speed control means 12a, 21b releases clamping the motor speed based on the motor speed clamp release signal VCOF.

The operation of motor speed clamping in embodiment 3 will be discussed with reference to FIGS. 6 and 7.

The input current determination means 12c compares the input current Ii found by the input current detection means 11 with the allowable current value I0 with respect to less-than, equal-to, or greater-than relation and if the input current Ii becomes greater than the allowable current value I0 (A1 in FIG. 7(a)), the input current determination means 12c outputs a signal to the effect that Ii>I0 to the motor speed clamp signal output means 19. If Ii becomes greater than I0, the motor speed clamp signal output means 19 outputs the motor speed clamp signal VCON to the spindle drive unit 2c and the servo drive unit 3c.

When the motor speed clamp signal input means 20a and 20b of the spindle drive unit 2c and the servo drive unit 3c input the motor speed clamp signal VCON, the means output the motor speed clamp signal VCON to the motor speed control means 21a and 21b. When the motor speed control means 21a and 21b input the motor speed clamp signal VCON, the means clamp the motor speed command (see FIG. 7(b)).

As the motor speed command is clamped, motor speed ω is clamped (A4 to B4 in FIG. 7(b)) and thus the input current Ii also lessens as shown in expression (1) described above (Ii ∝(ω×Id)).

If the input current Ii becomes equal to or less than the allowable current value I0 (B1 in FIG. 7(a)), the input current determination means 12c outputs a signal to the effect that Ii≦I0 to the motor speed clamp signal output means 19. If Ii becomes equal to or less than I0, the motor speed clamp signal output means 19 outputs the motor speed clamp release signal VCOF to the spindle drive unit 2c and the servo drive unit 3c.

When the motor drive current clamp signal input means 20a and 20b of the spindle drive unit 2c and the servo drive unit 3c input the motor speed clamp release signal VCOF, the means output the motor speed clamp release signal VCOF to the motor drive current control means 21a and 21b. When the motor speed control means 21a and 21b input the motor speed clamp release signal VCOF, the means release clamping the motor speed and restore the acceleration/deceleration command to the acceleration/deceleration command based on a position command from an NC unit 48 (B4 in FIG. 7(b)).

In the NC drive system of embodiment 3, if it is determined that the input current Ii of the motor drive power converter is greater than the allowable current value I0, the speed command is clamped, whereby the input current Ii is lowered. Thus, the input current Ii can also be lowered at high speed in a high-speed area wherein the motor output torque is small, and the system is suited for application where frequency is required, such as a semiconductor manufacturing apparatus.

Embodiment 4

Figure 8:
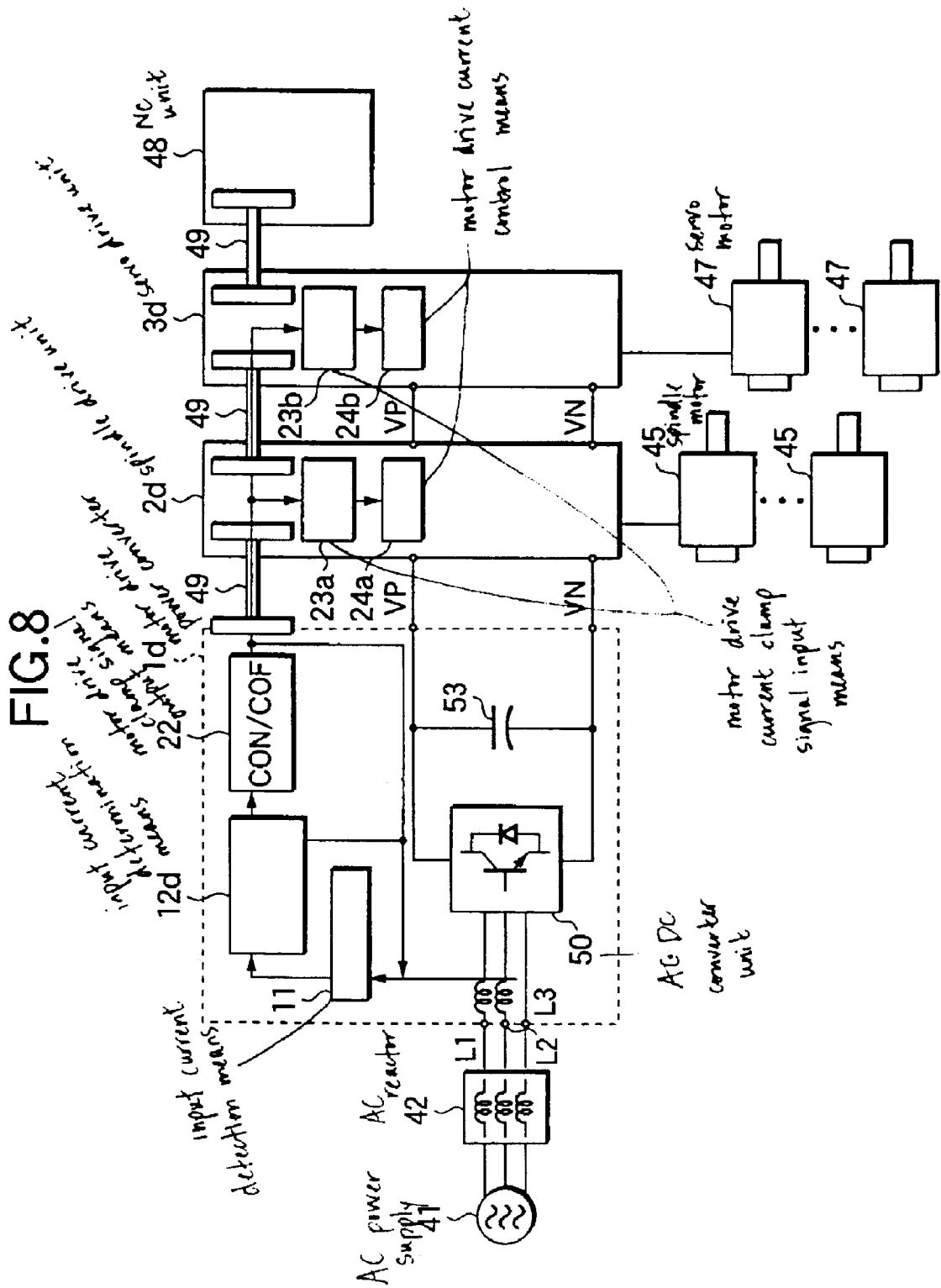
FIG. 8 is a drawing to show the configuration of an NC drive system according to embodiment 4 of the invention.

FIG. 8 is a drawing to show the configuration of an NC drive system according to embodiment 4 of the invention. In the FIG., numerals 11, 41, 42, 45, 47 to 49, 50, and 53 are similar to those in FIG. 1 and will not be discussed again. Numeral 1d denotes a motor drive power converter, numeral 2d denotes a spindle drive unit, and numeral 3d denotes a servo drive unit. Numeral 12d denotes input current determination means for comparing input current Ii with allowable current value I0 with respect to less-than, equal-to, or greater-than relation, and numeral 22 denotes motor drive current clamp signal output means as control signal output means for outputting a motor drive current clamp signal CON or a motor drive current clamp release signal COF to the spindle drive unit 2d and the servo drive unit 3d based on the determination result of the input current determination means 12d.

Numerals 23a and 23b denote motor drive current clamp signal input means for inputting the motor drive current clamp signal CON or the motor drive current clamp release signal COF, and numerals 24a and 24b denote motor drive current control means for clamping the motor drive current based on the command from the motor drive current clamp signal input means 23a and 23b; in embodiment 4, control signal execution means is made up of the motor drive current clamp signal input means 23a and 23b and the motor drive current control means 24a and 24b.

FIG. 9 is a drawing to show the characteristics in the NC drive system according to embodiment 4 of the invention; (a) shows the characteristic of the input current Ii detected by input current detection means 11, (b) shows the drive current characteristic of a motor (spindle motor 45 or servomotor 47), and (c) shows the characteristic of motor drive current. In the FIG., A1 is the point in time when the input current determination means 12d determines that input current Ii>allowable current value I0, A5 is the point in time when the motor drive current control means 24a, 24b clamps the motor drive current based on the motor drive current clamp signal CON, B1 is the point in time when the input current Ii lessens as the motor drive current is clamped and the input current determination means 12d determines that input current Ii≦allowable current value I0, and B5 is the point in time when the motor drive current control means 24a, 24b releases clamping the motor drive current based on the motor drive current clamp release signal COF.

The operation of motor drive current clamping in embodiment 4 will be discussed with reference to FIGS. 8 and 9.

Figure 9A:
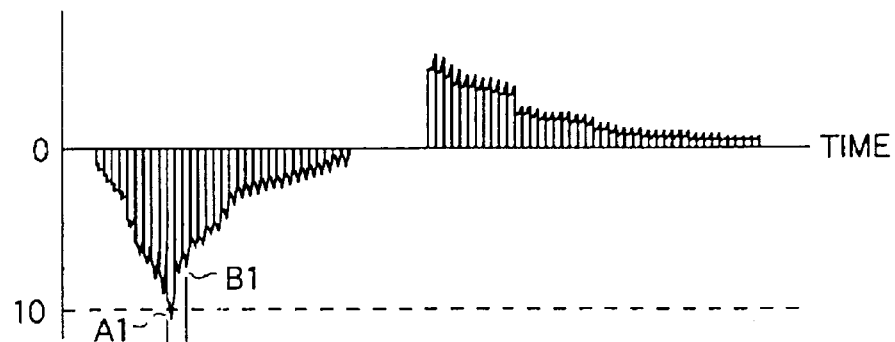
FIGS. 9(a), 9(b) and 9(c) and drawings to show the characteristics in the NC drive system according to embodiment 4 of the invention.

The input current determination means 12d compares the input current Ii found by the input current detection means 11 with the allowable current value I0 with respect to less-than, equal-to, or greater-than relation and if the input current Ii becomes greater than the allowable current value I0 (A1 in FIG. 9(a)), the input current determination means 12d outputs a signal to the effect that Ii>I0 to the motor drive current clamp signal output means 22. If Ii becomes greater than I0, the motor drive current clamp signal output means 22 outputs the motor drive current clamp signal CON to the spindle drive unit 2d and the servo drive unit 3d.

When the motor drive current clamp signal input means 23a and 23b of the spindle drive unit 2d and the servo drive unit 3d input the motor drive current clamp signal CON, the means output the motor drive current clamp signal CON to the motor drive current control means 24a and 24b. When 24a and 24b input the motor drive current clamp signal CON, the means clamp the motor drive current (see FIG. 9(c)).

As the motor drive current is clamped, the input current Ii also lessens as shown in expression (1) described above (Ii ∝(ω×Id)).

Figure 9B:
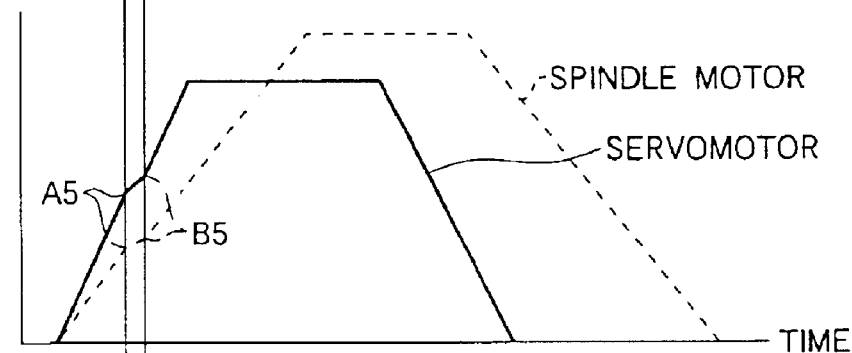
Figure 9C:
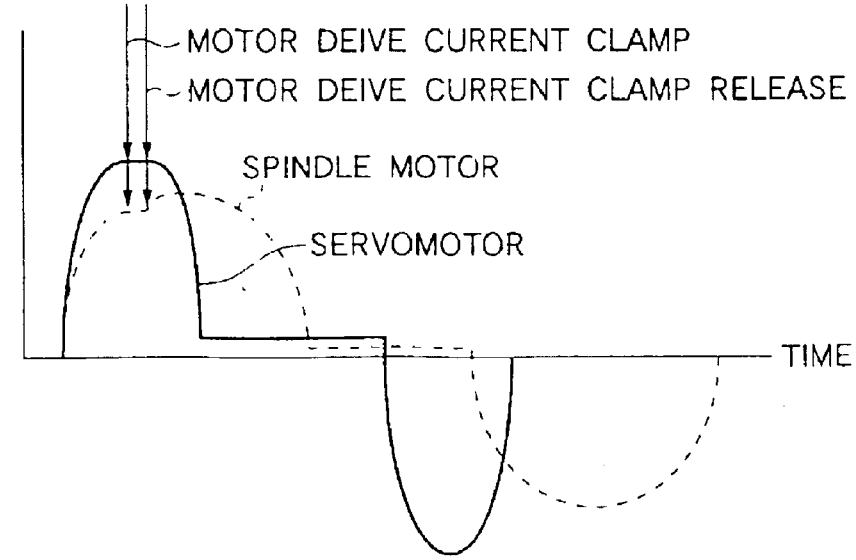

As the motor drive current is clamped, the inclination of speed command also lessens (A5 to B5 in FIG. 9(b)).

If the input current Ii becomes equal to or less than the allowable current value I0 (B1 in FIG. 9(a)), the input current determination means 12d outputs a signal to the effect that Ii≦I0 to the motor drive current clamp signal output means 22. If Ii becomes equal to or less than I0, the motor drive current clamp signal output means 22 outputs the motor drive current clamp release signal COF to the spindle drive unit 2d and the servo drive unit 3d.

When the motor drive current clamp signal input means 23a and 23b of the spindle drive unit 2d and the servo drive unit 3d input the motor drive current clamp release signal COF, the means output the motor drive current clamp release signal COF to the motor drive current control means 24a and 24b. When the motor drive current control means 24a and 24b input the motor drive current clamp release signal COF, the means release clamping the motor drive current and restore the acceleration/deceleration command to the acceleration/deceleration command based on a position command from an NC unit 48 (B5 point in FIG. 9(b)).

If it is determined that the input current Ii of the motor drive power converter is greater than the allowable current value I0, the speed change amount is controlled for lessening the inclination of the speed command, thereby decreasing the motor drive current for lowering the input current Ii as an example in embodiment 1. In embodiment 4, while the motor drive current is clamped and held, the motor speed is gradually decreased, thereby lowering the input current Ii; the system is suited for application where acceleration/deceleration is not required, such as a machine, etc., using a high-speed rotation spindle or a magnetic bearing.

Embodiment 5

Figure 10:
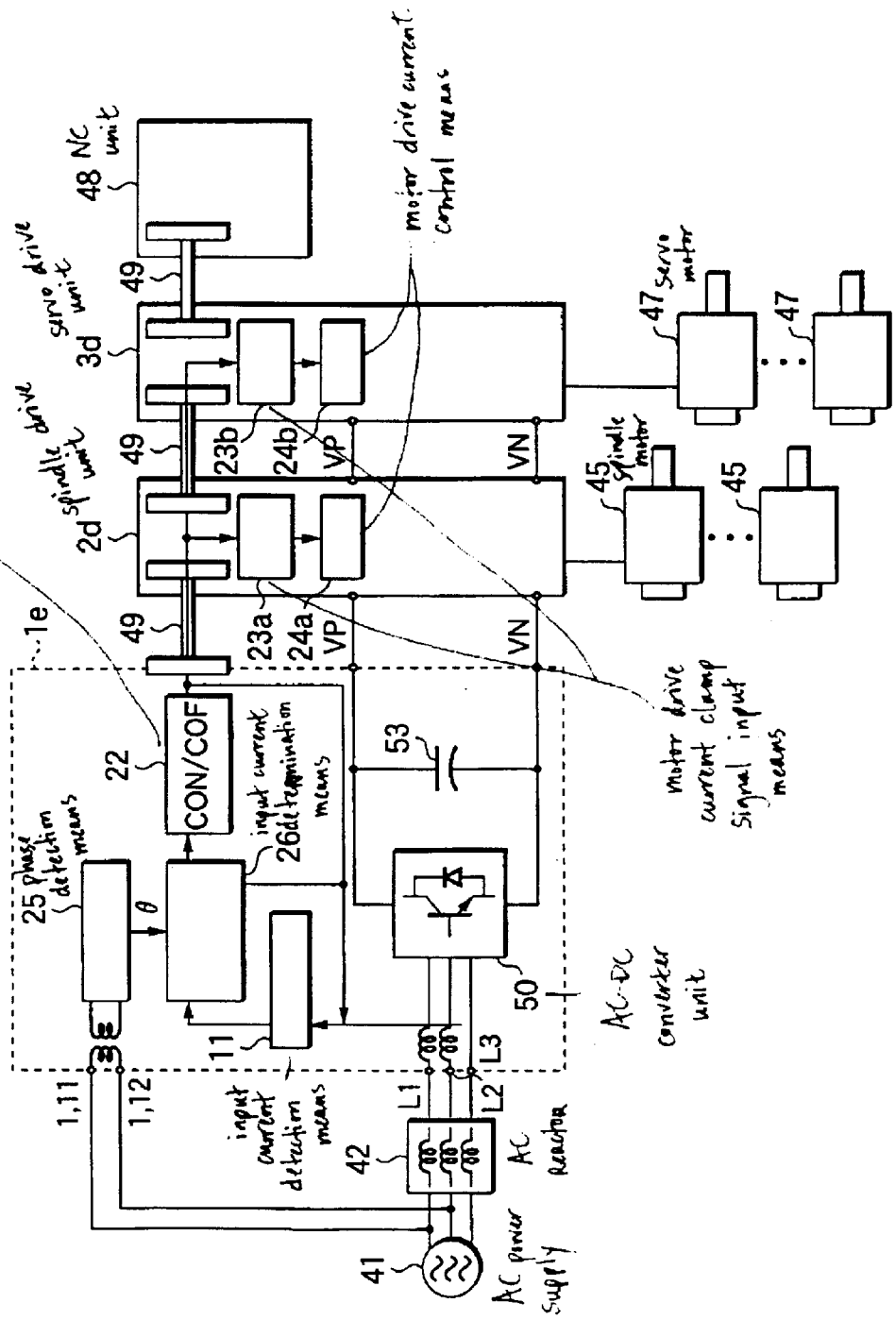
FIG. 10 is a drawing to show the configuration of an NC drive system according to embodiment 5 of the invention.

FIG. 10 is a drawing to show the configuration of an NC drive system according to embodiment 5 of the invention. In the FIG., numerals 2d, 3d, 11, 22, 23a, 23b, 24a, 24b, 41, 42, 45, 47 to 49, 50, and 53 are similar to those in FIG. 8 and will not be discussed again. Numeral 1e denotes a motor drive power converter, numeral 25 denotes phase detection means for detecting power supply phase θ of an AC power supply 41 with phases L11 and L12, and numeral 26 denotes input current determination means for inputting the power supply phase detected by the phase detection means 25 and comparing input current Ii with allowable current value I0 with respect to less-than, equal-to, or greater-than relation in the proximity of the power supply phase where the input current changes in direction.

Figure 11A:
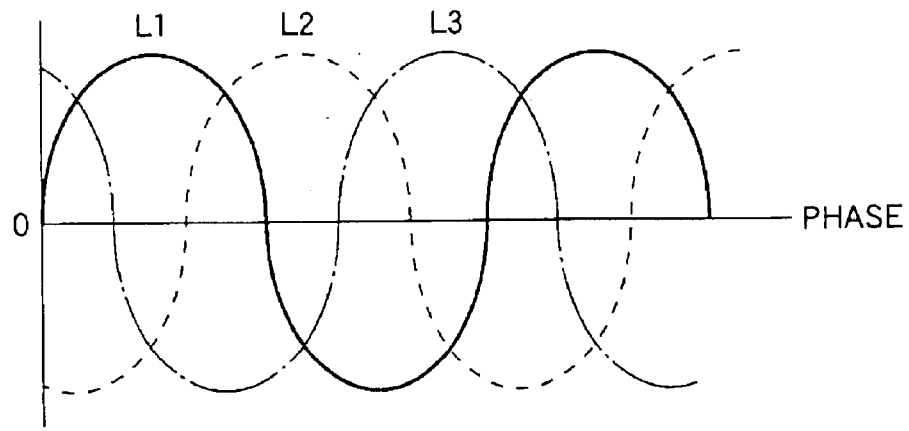
FIGS. 11(a) and 11(b) are drawings to show the characteristics in the NC drive system according to embodiment 5 of the invention.
Figure 11B:
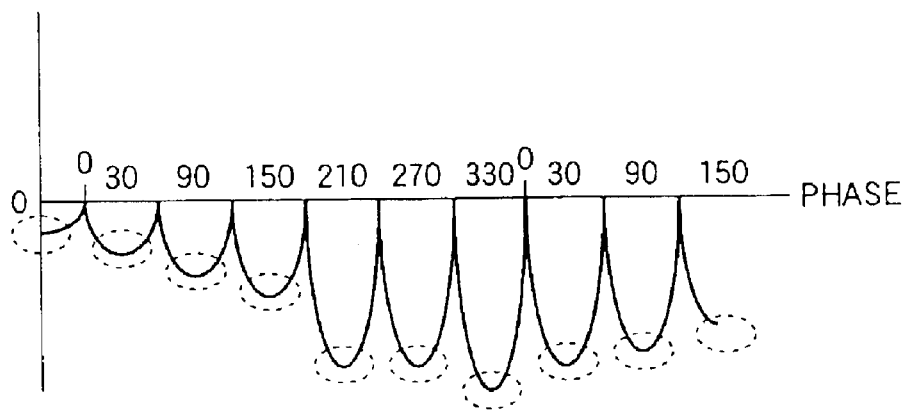

FIG. 11 is a drawing to show the characteristics in the NC drive system according to embodiment 5 of the invention; (a) shows the characteristic of input phase-to-phase voltage VAC and (b) shows the characteristic of the input current Ii detected by the input current detection means 11. The input current Ii found by detecting input currents IL1 and IL2 of phases L1 and L2 in input current detection means 11 has a flowing phase changing on T/6 period based on the less-than, equal-to, or greater-than relation between the phase-to-phase voltages, and becomes zero every T/6. The input current Ii changes in direction every power supply phase 60° of 30°, 90°, 150°, 210°, and 270°; the input current Ii reaches the maximum when the power supply phase θ is 330°.

Using the characteristic of change in the input current Ii found in the input current detection means 11, the input current determination means 26 compares the input current Ii with the allowable current value I0 with respect to less-than, equal-to, or greater-than relation in the proximity of the power supply phase e where the input current Ii grows as the power supply phase θ detected by the phase detection means 25 is 30°, 90°, 150°, 210°, 270°, 330°.

The example wherein the input current determination means 12d of embodiment 4 described above always compares the input current Ii with the allowable current value I0 with respect to the less-than, equal-to, or greater-than relation has been described. In embodiment 5, the phase detection means 25 for detecting the power supply phase θ is provided and the input current determination means 26 does not always compare the input current Ii with the allowable current value I0 with respect to the less-than, equal-to, or greater-than relation and can efficiently compare the input current Ii with the allowable current value I0 with respect to the less-than, equal-to, or greater-than relation in the proximity of the power supply phase θ where the input current Ii grows.

The example has been given wherein the input current determination means 12d for always comparing the input current Ii with the allowable current value I0 with respect to the less-than, equal-to, or greater-than relation in embodiment 4 is replaced with the input current determination means 26 for comparing the input current Ii with the allowable current value I0 with respect to the less-than, equal-to, or greater-than relation in the proximity of the phase detection means 25 for detecting the power supply phase θ and the power supply phase θ where the input current Ii grows. However, the input current determination means 12a in embodiment 1, the input current determination means 12b in embodiment 2, or the input current determination means 12c in embodiment 3 may be replaced with the input current determination means 26 for comparing the input current Ii with the allowable current value I0 with respect to the less-than, equal-to, or greater-than relation.

Embodiment 6

Figure 12:
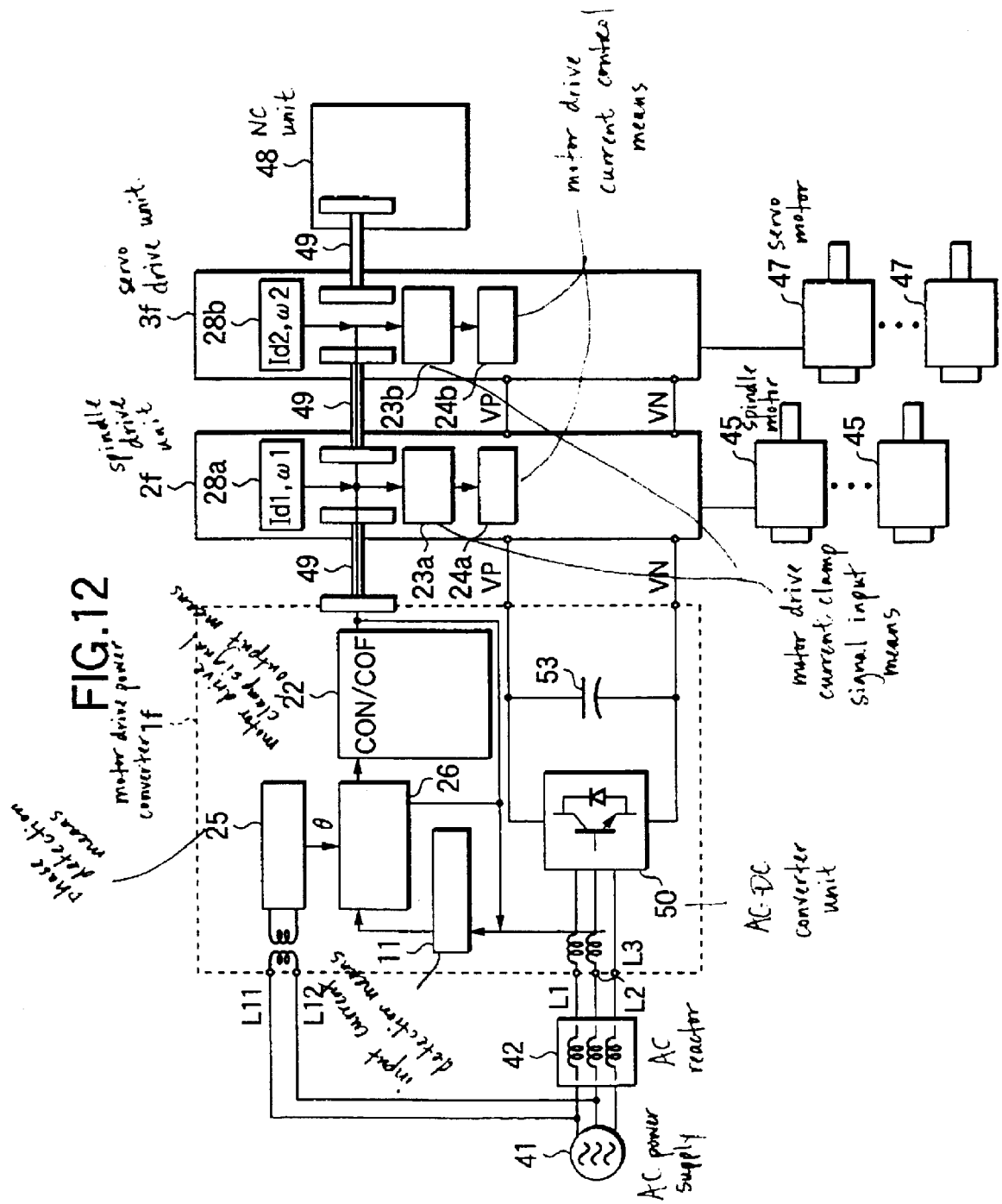
FIG. 12 is a drawing to show the configuration of an NC drive system according to embodiment 6 of the invention.

FIG. 12 is a drawing to show the configuration of an NC drive system according to embodiment 6 of the invention. In the FIG., numerals 11, 23a, 23b, 24a, 24b, 41, 42, 45, 47 to 49, 50, and 53 are similar to those in FIG. 8 and will not be discussed again. Numeral 1f denotes a motor drive power converter, numeral 2f denotes a spindle drive unit, and numeral 3f denotes a servo drive unit. Numeral 25 denotes phase detection means for detecting power supply phase θ of an AC power supply 41 with phases L11 and L12, numeral 26 denotes input current determination means for comparing input current Ii with allowable current value I0 with respect to less-than, equal-to, or greater-than relation based on the determination result of the phase detection means 25, and numeral 27 denotes motor drive current clamp signal output means as control signal output means for outputting a motor drive current clamp signal CON or a motor drive current clamp release signal COF to the spindle drive unit 2f and the servo drive unit 3f based on the determination result of the input current determination means 26, the determination result of the phase detection means 25, motor drive current Id1 of the spindle drive unit 2f, and motor drive current Id2 of the servo drive unit 3f. Numeral 28a denotes data output means for outputting the motor drive current Idi and motor speed ω1 of the spindle drive unit 2f via a bus line 49 to the motor drive current clamp signal output means 27, and numeral 28b denotes data output means for outputting the motor drive current Id2 and motor speed ω2 of the servo drive unit 3f via the bus line 49 to the motor drive current clamp signal output means 27.

The motor drive current clamp signal output means 27 compares Id1×ω1 with Id2×ω2 with respect to less-than, equal-to, or greater-than relation based on the motor drive currents Id1 and Id2 and the motor speeds ω1 and ω2 input from the data output means 28a and 28b, selects the drive unit whose motor drive current is to be clamped, and outputs the motor drive current clamp signal CON.

In embodiments 1 to 5, the example has been given wherein when input current Ii≧allowable current value I0, the control signal for lowering the input current Ii (acceleration/deceleration command change request signal VON, gate shut-off request signal GOF, motor speed clamp signal VCON, or motor drive current clamp signal CON) is output to all drive units to which the motor drive power converter supplies power. In embodiment 6, the drive unit to which the control signal for lowering the input current Ii is to be output is selected.

Figure 13:
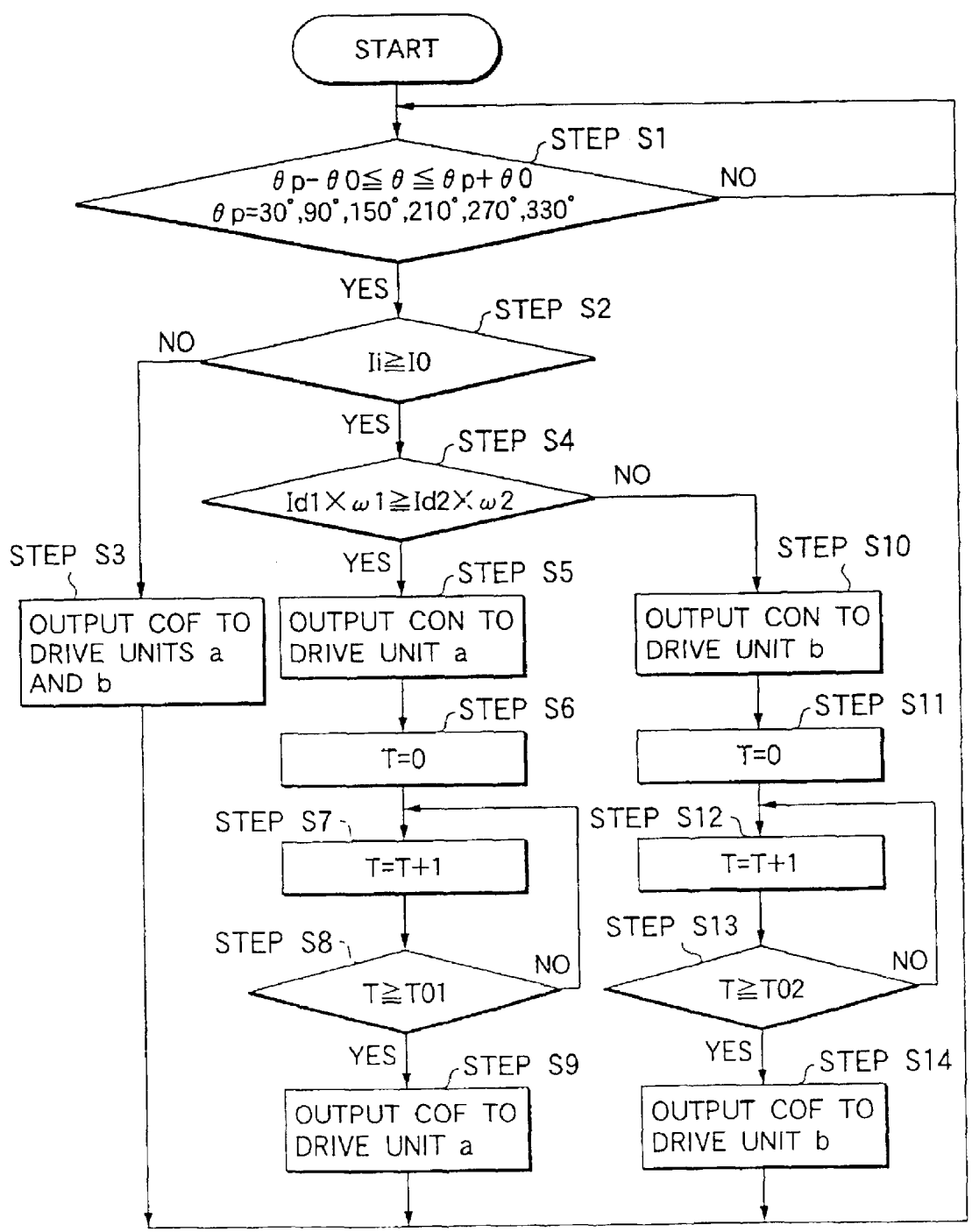
FIG. 13 is a drawing to show a flowchart of the NC drive system according to embodiment 6 of the invention.

FIG. 13 is a drawing to show a flowchart of the NC drive system according to embodiment 6 of the invention.

At step S1, the input current determination means 26 determines whether or not the power supply phase θ detected by the phase detection means 25 is the power supply phase where the input current Ii reaches the peak value. Letting θp be the power supply phase θ where the input current Ii reaches the peak value (30°, 90°, 150°, 210°, 270°, 330°) and θ0 be the phase width in the proximity of the power supply phase θp, if the power supply phase θ is in the following expression:

$$\theta p - \theta 0 \leq \theta \leq \theta p + \theta 0$$

the input current determination means 26 determines that the power supply phase θ is in the proximity of the power supply phase θp where the input current Ii reaches the peak value, and compares the input current Ii with the allowable current value I0 with respect to the less-than, equal-to, or greater-than relation.

At step S2, the input current determination means 26 compares the input current Ii with the allowable current value I0 with respect to the less-than, equal-to, or greater-than relation and if input current Ii≦allowable current value I0, the motor drive current clamp release signal COE is output to drive units a and b (corresponding to the spindle drive unit 2f and the servo drive unit 3f in FIG. 12) at step S3.

If input current Ii≧ allowable current value I0, subsequently at step S4, the motor drive current clamp signal output means 27 compares Id1×ω1 with Id2×ω2 with respect to the less-than, equal-to, or greater-than relation based on the motor drive currents Id1 and Id2 and the motor speeds ω1 and ω2 input from the drive units a and b, selects the drive unit whose motor drive current is to be clamped, and outputs the motor drive current clamp signal CON. The motor drive current clamp release signal COF is output to any other drive unit than the drive unit whose motor drive current is to be clamped.

If Id1×ω1≧Id2×ω2, at step S5 the motor drive current clamp signal CON is output to the drive unit a outputting the motor drive current Id1 and the motor speed ω1. A timer value T to maintain the motor drive current clamp signal CON is set to 0 at step S6 and then the numeric value is updated (step S7) and if the value T becomes a timer reference value T01 for the drive unit a (T≧T01) (step S8), the motor drive current clamp release signal COF is output at step S9.

If it is determined at step S4 that Id1×ω1<Id2×ω2, at step S10 the motor drive current clamp signal CON is output to the drive unit b outputting the motor drive current Id2 and the motor speed ω2. A timer value T to maintain the motor drive current clamp signal CON is set to 0 at step S11 and then the numeric value is updated (step S12) and if the value T becomes a timer reference value T02 for the drive unit b (T≧T02) (step S13), the motor drive current clamp release signal COF is output at step S14.

At step S4, the example has been given wherein the drive unit with the larger product of the motor drive current and the motor speed (Id1×ω1, Id2×ω2) is selected and the motor drive current is clamped. However, if the operation characteristics, etc., of the drive unit are previously known, only either one motor drive current or one motor speed may be compared with another with respect to the less-than, equal-to, or greater-than relation for selecting the drive unit whose motor drive current is to be clamped.

The example has been given wherein the number of drive units to which the motor drive power converter supplies power is two, the drive unit a (spindle drive unit 2f in FIG. 12) and the drive unit b (servo drive unit 3f in FIG. 12), and wherein when input current Ii>allowable current value I0, the motor drive current clamp signal CON is output to the drive unit with the larger product of the motor drive current and the motor speed (steps S4, S5, and S10). If the number of drive units to which the motor drive power converter supplies power is three or more, the number of drive units starting at the drive unit with the largest product of the motor drive current and the motor speed may be determined properly for clamping the motor drive current.

At steps S5 and S10, the example wherein the motor drive current clamp signal CON is output has been given. However, the acceleration/deceleration command change request signal VON for changing the acceleration/deceleration command (in embodiment 1), the gate shut-off request signal GOF for shutting off the gates (in embodiment 2), or the motor speed clamp signal VCON for clamping the motor speed (in embodiment 3) maybe output.

In embodiment 6, the drive unit providing the large effect of lowering the input current Ii is selected, the control signal to lower the input current Ii is output thereto, and control of any other drive unit providing the small effect of lowering the input current Ii is maintained, so that the input current Ii can be lowered efficiently.

Embodiment 7

Figure 14:
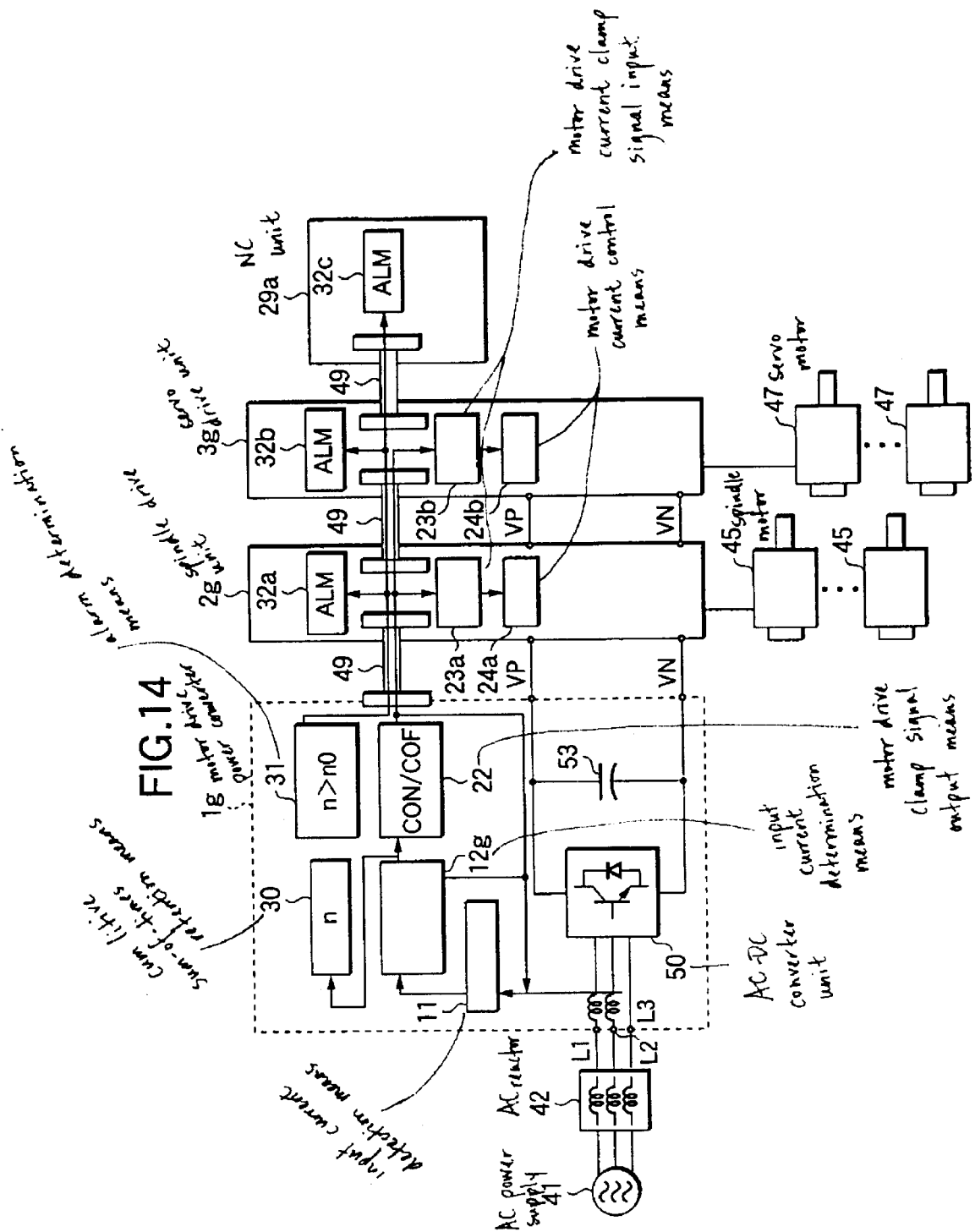
FIG. 14 is a drawing to show the configuration of an NC drive system according to embodiment 7 of the invention.

FIG. 14 is a drawing to show the configuration of an NC drive system according to embodiment 7 of the invention. In the FIG., numerals 11, 22, 23a, 23b, 24a, 24b, 41, 42, 45, 47, 49, 50, and 53 are similar to those in FIG. 8 and will not be discussed again. Numeral 1f denotes a motor drive power converter, numeral 2g denotes a spindle drive unit, numeral 3g denotes a servo drive unit, and numeral 29a denotes an NC unit. Numeral 12g denotes input current determination means for comparing input current Ii with allowable current value I0 with respect to less-than, equal-to, or greater-than relation, numeral 30 denotes cumulative-sum-of-times retention means for retaining the cumulative sum of times n the input current determination means 12g has determined that the input current Ii exceeds the allowable current value I0, numeral 31 denotes alarm determination means for outputting an alarm signal ALM to the spindle drive unit 2g, the servo drive unit 3g, and the NC unit 29a if the cumulative sum of times n retained in the cumulative-sum-of-times retention means 30 becomes equal to or greater than a reference value n0, and numerals 32a, 32b, and 32c denote alarm input means in the spindle drive unit 2g, the servo drive unit 3g, and the NC unit 29a.

The cumulative-sum-of-times retention means 30 retains the cumulative sum of times n the input current determination means 12g has determined that the input current Ii exceeds the allowable current value I0, and the alarm determination means 31 outputs an alarm signal ALM to the spindle drive unit 2g, the servo drive unit 3g, and the NC unit 29a if the cumulative sum of times n the input current Ii has exceeded the allowable current value I0 becomes equal to or greater than the reference value n0.

In embodiment 7, the motor drive power converter comprises the cumulative-sum-of-times retention means for retaining the cumulative sum of times the input current determination means has determined that the input current exceeds the allowable current value, and the alarm determination means for outputting an alarm to the drive units and the numerical control unit if the cumulative sum of times retained in the cumulative-sum-of-times retention means becomes equal to or greater than the reference value. Thus, the operator can check an alarm on the drive units and the numerical control unit and can easily evaluate the high-acceleration/deceleration operation being executed.

Embodiment 8

Figure 15:
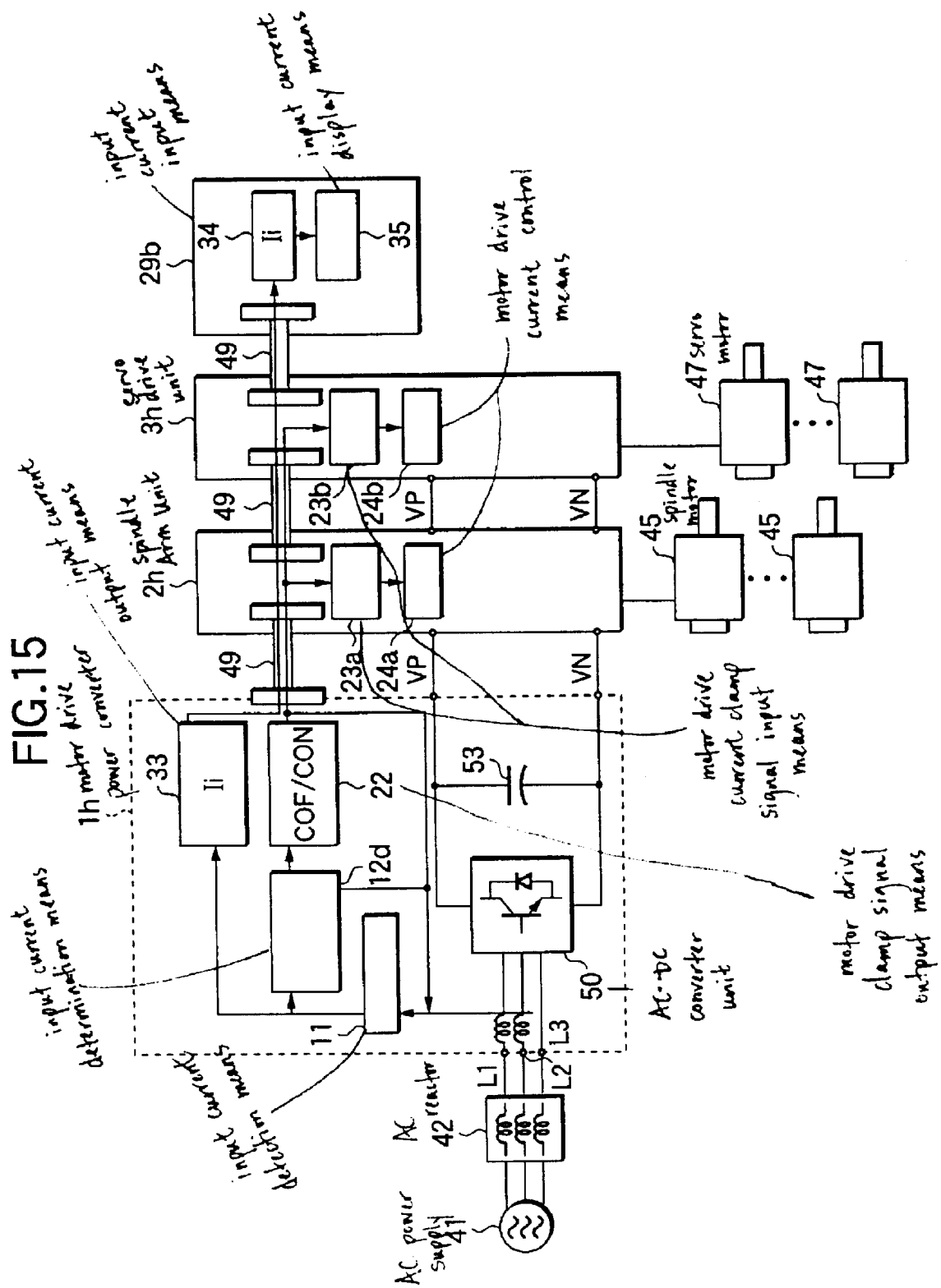
FIG. 15 is a drawing to show the configuration of an NC drive system according to embodiment 8 of the invention.

FIG. 15 is a drawing to show the configuration of an NC drive system according to embodiment 8 of the invention. In the Figure, numerals 11, 22, 23a, 23b, 24a, 24b, 41, 42, 45, 47, 49, 50, and 53 are similar to those in FIG. 8 and will not be discussed again. Numeral 1h denotes a motor drive power converter, numeral 2h denotes a spindle drive unit, numeral 3h denotes a servo drive unit, and numeral 29b denotes an NC unit. Numeral 33 denotes input current output means for outputting input current Ii found by input current detection means 11 via a bus line 49 to the NC unit 29b, numeral 34 denotes input current input means, and numeral 35 denotes input current display means for displaying the input current Ii.

In embodiments 1 to 7, when input current Ii>allowable current value I0, the control signal to lower the input current Ii is output to the drive unit. The input current output means 33 of embodiment 8 outputs the input current Ii found by the input current detection means 11 to the NC unit 29b driving the drive unit.

In embodiment 8, the motor drive power converter outputs the input current found by the input current detection means to the numerical control unit, so that it is made possible to take steps on the NC unit for outputting a control command for driving a motor to the drive unit.

The advantages of the invention described above are as follows:

In the numerical control drive system of the invention, the motor drive power converter comprises input current detection means for finding an input current, input current determination means for comparing the input current found by the input current detection means with an allowable current value with respect to less-than, equal-to, or greater-than relation, and control signal output means for outputting a control signal to the drive unit based on the determination result of the input current determination means, the drive unit comprises control signal execution means for changing the control command from the numerical control unit based on the control signal output from the control signal output means, and if the input current determination means determines that the input current is greater than the allowable current value, the control signal execution means of the drive unit changes the control command from the numerical control unit, thereby lowering the input current, so that stable motor control can be executed without increasing the capacity of the motor drive power converter for high-speed, high-acceleration drive of the numerical control drive system.

If the input current determination means determines that the input current is greater than the allowable current value, the control signal execution means controls the speed change amount for lessening the inclination of a speed command, so that the input current of the motor drive power converter can be lowered with the speed control maintained.

If the input current determination means determines that the input current is greater than the allowable current value, the control signal execution means sets the drive current of the drive unit to zero, so that the input current of the motor drive power converter can be lowered at high speed.

If the input current determination means determines that the input current is greater than the allowable current value, the control signal execution means clamps a speed command, so that the input current of the motor drive power converter can be lowered at high speed in a high-speed area wherein the motor output torque is small.

If the input current determination means determines that the input current is greater than the allowable current value, the control signal execution means gradually decreases the motor speed, thereby lowering the input current Ii while the drive current of the drive unit is clamped and held. Thus, the system is suited for application where acceleration/deceleration is not required, such as a machine, etc., using a high-speed rotation spindle or a magnetic bearing.

The motor drive power converter comprises phase detection means for detecting a power supply phase of the AC power and the input current determination means inputs the power supply phase detected by the phase detection means and compares the input current with the allowable current value with respect to the less-than, equal-to, or greater-than relation in the proximity of the power supply phase where the input current changes in direction, so that the input current can be efficiently compared with the allowable current value with respect to the less-than, equal-to, or greater-than relation.

The control signal output means inputs at least either motor drive currents or motor speeds from the drive units to which the DC power is supplied, and selects the drive unit to which the control signal is to be output, so that the input current of the motor drive power converter can be lowered efficiently.

The motor drive power converter comprises cumulative-sum-of-times retention means for retaining the cumulative sum of times the input current determination means has determined that the input current exceeds the allowable current value, and alarm determination means for outputting an alarm to the drive units and the numerical control unit if the cumulative sum of times retained in the cumulative-sum-of-times retention means becomes equal to or greater than a reference value. Thus, the operator can check an alarm on the drive units and the numerical control unit and can easily evaluate the high-acceleration/deceleration operation being executed.

The motor drive power converter comprises input current output means for outputting the input current found by the input current detection means to the numerical control unit, so that it is made possible to take steps on the numerical control unit for outputting a control command for driving a motor to the drive unit.

Industrial Applicability

As described above, the numerical control system according to the invention is suited for use in a numerical control system using a servo drive unit and a spindle drive unit put into a high gain for performing high-speed, high-acceleration driving.

What is claimed is:

1. A numerical control drive system having two or more drive units, said numerical control drive system comprising a servo drive unit for driving a motor, a spindle drive unit, a numerical control unit for outputting a control command for driving the motor to said two or more drive units, and a motor drive power converter for converting AC power supplied from an AC power supply into DC power and supplying the DC power to said two or more drive units, wherein said motor drive power converter comprises input current detection means for finding an input current of the AC power supplied from the AC power supply, input current determination means for comparing the input current found by the input current detection means with an allowable current value with respect to at least one of a less-than, equal-to, and greater-than relation, and control signal output means for inputting at least one of motor drive currents or motor speeds from said two or more drive units to which the DC power is supplied, selecting the drive unit providing a large effect of lowering the input current, and outputting a control signal thereto if the input current determination means determines that the input current is greater than the allowable current value, wherein said drive unit comprises control signal execution means for changing the control command from said numerical control unit based on the control signal output from the control signal output means, and wherein the control signal execution means of said drive unit inputting the control signal changes the control command from said numerical control unit, thereby lowering the input current.

2. The numerical control drive system as claimed in claim 1 wherein if the input current determination means determines that the input current is greater than the allowable current value, the control signal execution means performs processing of lessening the inclination of a speed command.

3. The numerical control drive system as claimed in claim 1 wherein if the input current determination means determines that the input current is greater than the allowable current value, the control signal execution means shuts off gates of switching elements of said drive units.

4. The numerical control drive system as claimed in claim 1 wherein if the input current determination means determines that the input current is greater than the allowable current value, the control signal execution means clamps a speed command.

5. The numerical control drive system as claimed in claim 1 wherein if the input current determination means determines that the input current is greater than the allowable current value, the control signal execution means clamps a motor drive current.

6. The numerical control drive system as claimed in claim 1 wherein said motor drive power converter comprises phase detection means for detecting a power supply phase of the AC power and the input current determination means inputs the power supply phase detected by the phase detection means and compares the input current with the allowable current value with respect to the less-than, equal-to, or greater-than relation in the proximity of the power supply phase where the input current changes in direction.

7. The numerical control drive system as claimed in claim 1 wherein said motor drive power converter comprises cumulative-sum-of-times retention means for retaining the cumulative sum of times the input current determination means has determined that the input current exceeds the allowable current value, and alarm determination means for outputting an alarm to said drive units and said numerical control unit if the cumulative sum of times retained in the cumulative-sum-of-times retention means becomes equal to or greater than a reference value.

8. The numerical control drive system as claimed in claim 1 wherein said motor drive power converter comprises input current output means for outputting the input current found by the input current detection means to said numerical control unit.

* * * * *